(12) United States Patent
Zhang et al.

(10) Patent No.: US 11,596,043 B2
(45) Date of Patent: Feb. 28, 2023

(54) PASSIVE INFRARED SENSOR DEVICE

(71) Applicant: GOOGLE LLC, Mountain View, CA (US)

(72) Inventors: Clare Zhang, Mountain View, CA (US); James Castro, San Jose, CA (US); Ken Jenks, San Jose, CA (US); Bryan Macomber, Los Altos Hills, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 16/983,631

(22) Filed: Aug. 3, 2020

(65) Prior Publication Data
US 2021/0018369 A1 Jan. 21, 2021

Related U.S. Application Data

(63) Continuation of application No. 15/876,824, filed on Jan. 22, 2018, now Pat. No. 10,732,051.

(51) Int. Cl.
*H05B 47/13* (2020.01)
*G01J 5/10* (2006.01)
*G08B 13/191* (2006.01)
*H04N 5/33* (2006.01)
*G08B 5/36* (2006.01)
(Continued)

(52) U.S. Cl.
CPC .............. *H05B 47/13* (2020.01); *G01J 5/025* (2013.01); *G01J 5/10* (2013.01); *G08B 5/36* (2013.01); *G08B 13/186* (2013.01); *G08B 13/191* (2013.01); *G08B 13/193* (2013.01);
(Continued)

(58) Field of Classification Search
CPC ......... H05B 47/13; H05B 47/11; G01J 5/025; G01J 5/10; G08B 5/36; G08B 13/186; G08B 13/191; G08B 13/193; G08B 25/08; H04N 5/33
See application file for complete search history.

(56) References Cited

U.S. PATENT DOCUMENTS 2,185,509 A   1/1940  Lambert
3,849,614 A * 11/1974  Connery ............ G08B 13/1436
                                              200/61.93
(Continued)

OTHER PUBLICATIONS

Partial European Search Report for Application No. 19151522.0, dated Jun. 27, 2019, 12 pages.
(Continued)

*Primary Examiner* — Blake C Riddick
(74) *Attorney, Agent, or Firm* — Kilpatrick Townsend & Stockton LLP

(57) ABSTRACT

Systems and techniques are provided for sensor device. A sensor device may include a housing, a lens inserted into a first opening of the housing, a metal mask covering a portion of the interior of the lens, a passive infrared (PIR) sensor underneath the lens and the metal mask, and a light pipe around the PIR sensor, the lens, and the metal mask. Part of the light pipe may be positioned above an activation mechanism for a button. An airflow gasket may be around the PIR sensor. A filter circuit board may be under the PIR sensor and connected to leads of the PIR sensor. A control circuit board may include the activation mechanism for the button. A backplate may include a slot for attachment to a snap of a magazine in the housing of the sensor device.

20 Claims, 19 Drawing Sheets

(51) Int. Cl.
  *G01J 5/02* (2022.01)
  *G08B 25/08* (2006.01)
  *G08B 13/193* (2006.01)
  *G08B 13/186* (2006.01)
  *H05B 47/11* (2020.01)

(52) U.S. Cl.
  CPC ............... *G08B 25/08* (2013.01); *H04N 5/33* (2013.01); *H05B 47/11* (2020.01)

(56) References Cited

U.S. PATENT DOCUMENTS

| | | | |
|---|---|---|---|
| 4,121,103 | A | 10/1978 | Calhoun |
| 4,275,303 | A | 6/1981 | Mudge |
| 4,447,726 | A | 5/1984 | Mudge |
| 4,451,734 | A | 5/1984 | St Jean |
| 4,484,075 | A | 11/1984 | Kahl, Jr. |
| 4,709,151 | A | 11/1987 | Guscott |
| 4,757,204 | A | 7/1988 | Baldwin |
| 4,904,192 | A | 2/1990 | Holden |
| 5,019,803 | A | 5/1991 | Maram |
| 5,699,243 | A | 12/1997 | Eckel |
| 5,901,881 | A | 5/1999 | Wang |
| 6,096,054 | A | 8/2000 | Wyzgala |
| 6,222,191 | B1 | 4/2001 | Myron |
| 6,375,369 | B1 | 4/2002 | Schneider |
| 6,446,693 | B1 | 9/2002 | Anderson |
| 7,170,403 | B2 | 1/2007 | Noguchi |
| 7,800,049 | B2 | 9/2010 | Bandringa |
| 2003/0065472 | A1 | 4/2003 | Eckel |
| 2003/0111375 | A1 | 6/2003 | Kilmartin |
| 2006/0005809 | A1 | 1/2006 | Kado |
| 2006/0196095 | A1 | 9/2006 | Flannigan |
| 2007/0040674 | A1* | 2/2007 | Hsu .......................... G06F 21/83 340/539.31 |
| 2007/0125909 | A1 | 6/2007 | Seiersen |
| 2008/0042809 | A1* | 2/2008 | Watts .................. B60R 25/1003 340/426.16 |
| 2008/0099505 | A1 | 5/2008 | Lawlor |
| 2009/0250375 | A1 | 10/2009 | Ecker |
| 2011/0121967 | A1* | 5/2011 | Benjelloun .......... G08B 13/149 340/540 |
| 2012/0039498 | A1 | 2/2012 | Yasui |
| 2012/0128025 | A1 | 5/2012 | Huppi |
| 2012/0187260 | A1 | 7/2012 | Moyer |
| 2014/0084165 | A1 | 3/2014 | Fadell |
| 2015/0070190 | A1 | 3/2015 | Wai Fong |
| 2015/0216017 | A1 | 7/2015 | Pratt |
| 2016/0254837 | A1 | 9/2016 | Rayner |
| 2016/0334076 | A1 | 11/2016 | Dong |
| 2016/0335881 | A1 | 11/2016 | Dong |
| 2016/0338212 | A1 | 11/2016 | Schmidt |
| 2017/0089557 | A1 | 3/2017 | Ericson |
| 2017/0131149 | A1 | 5/2017 | Witty |
| 2018/0179083 | A1 | 6/2018 | Cooper |
| 2019/0206207 | A1 | 7/2019 | Mysell |

OTHER PUBLICATIONS

Extended European Search Report for Application No. EP19151522.0, dated Nov. 19, 2019, 13 pages.
European Patent Office Communication pursuant to Article 94(3) EPC for App. No. EP19151522.0, dated Jan. 17, 2022, 6 pages.

* cited by examiner

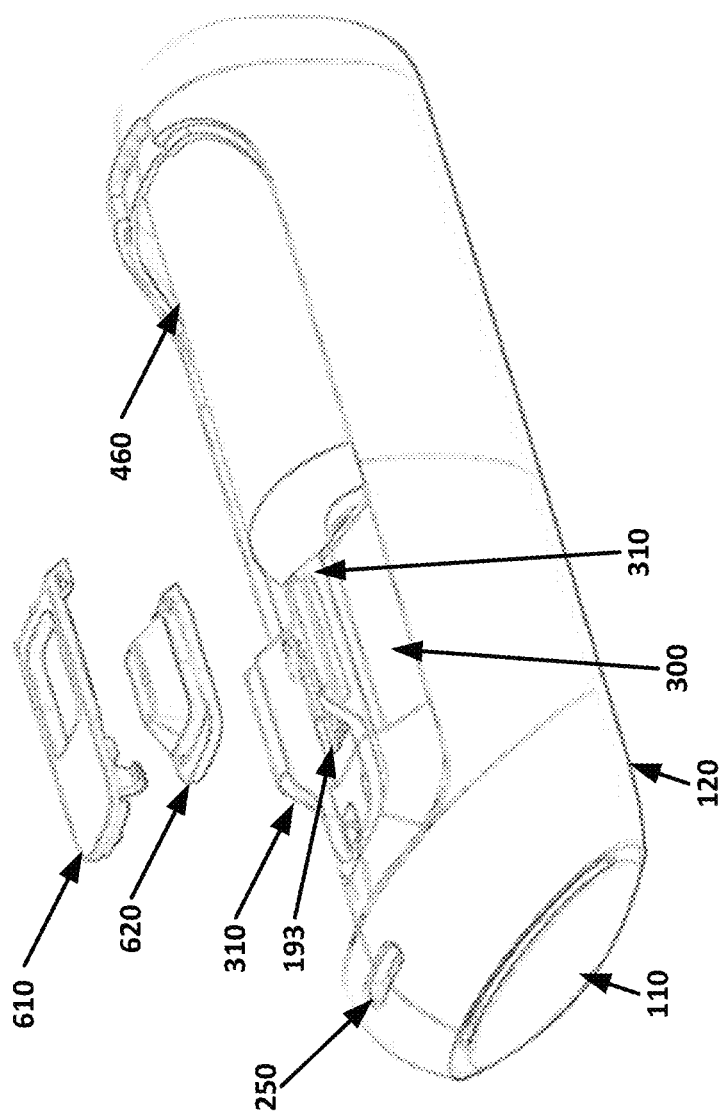
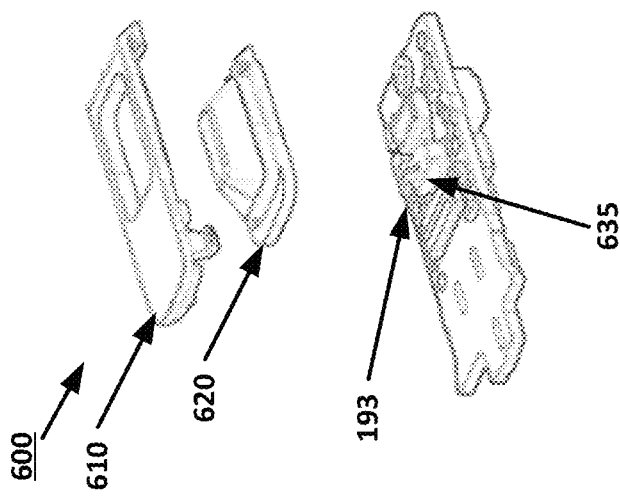

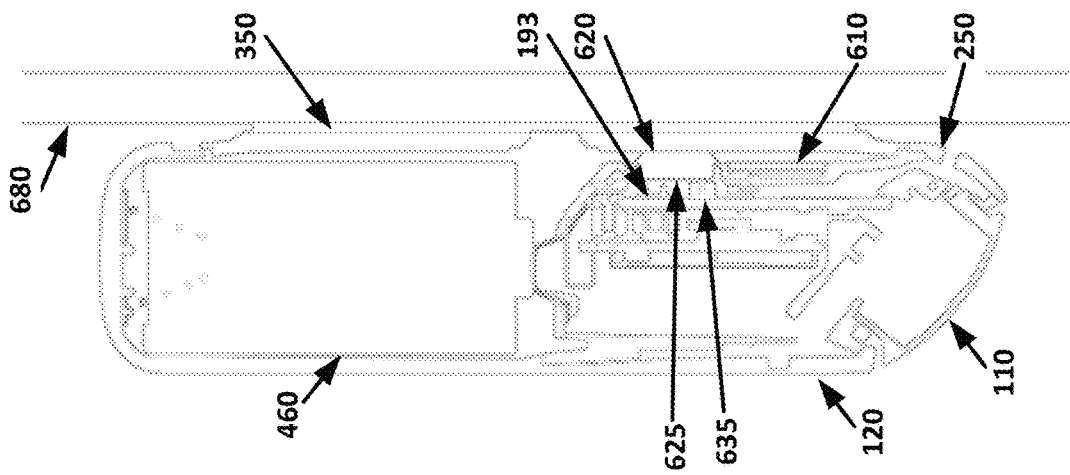
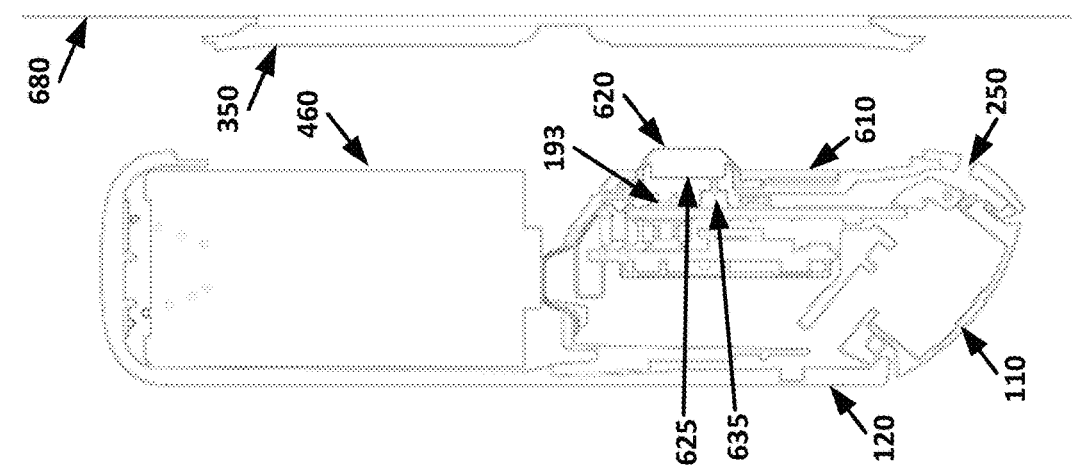
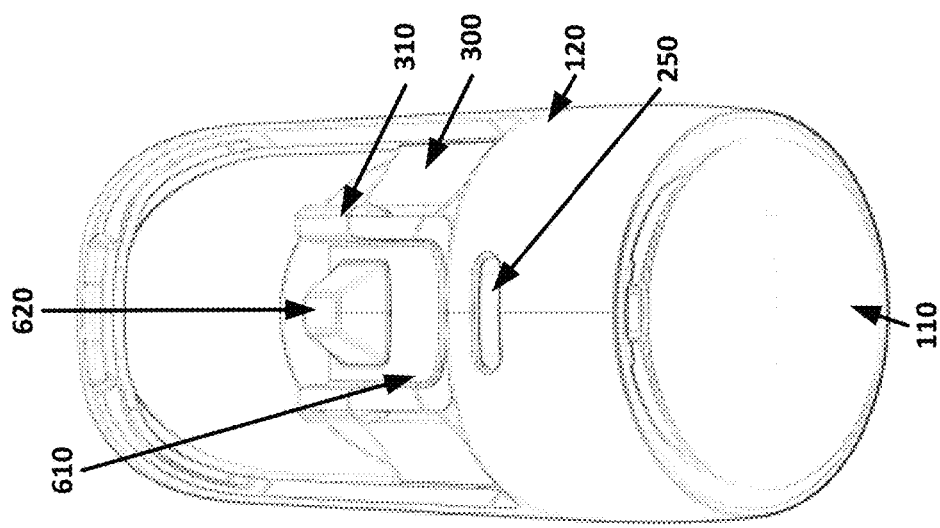

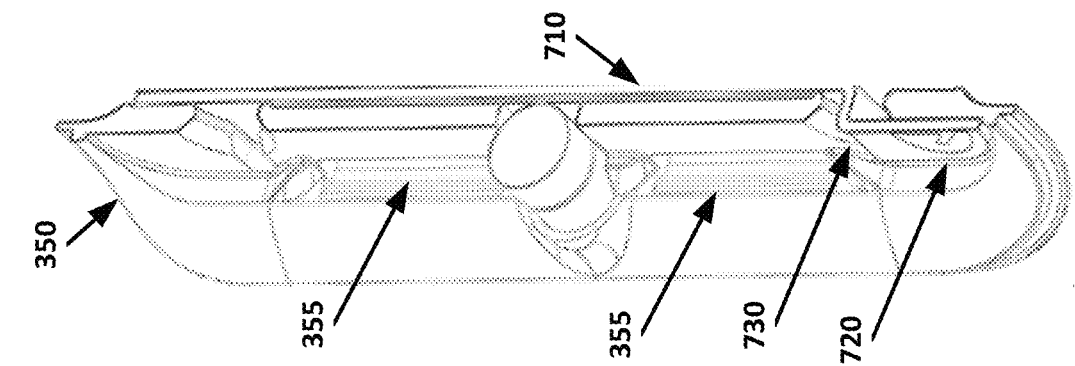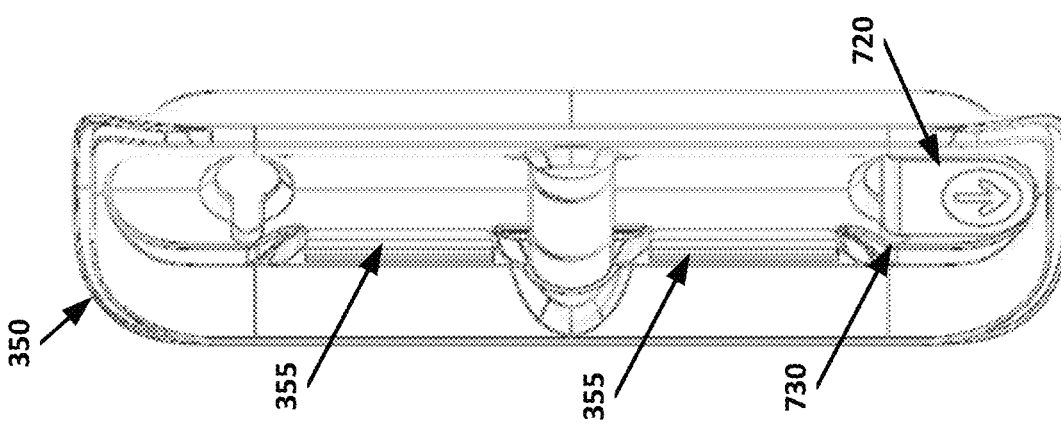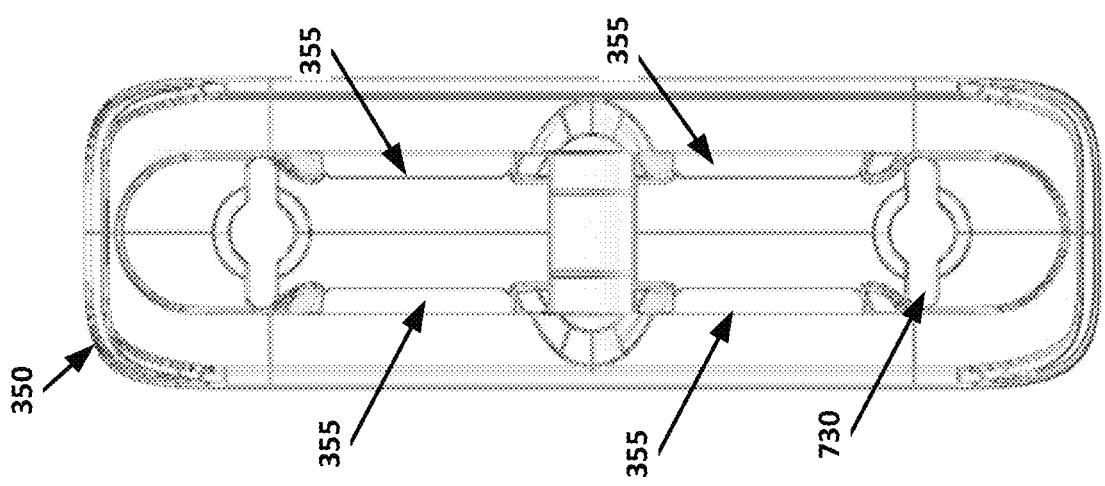

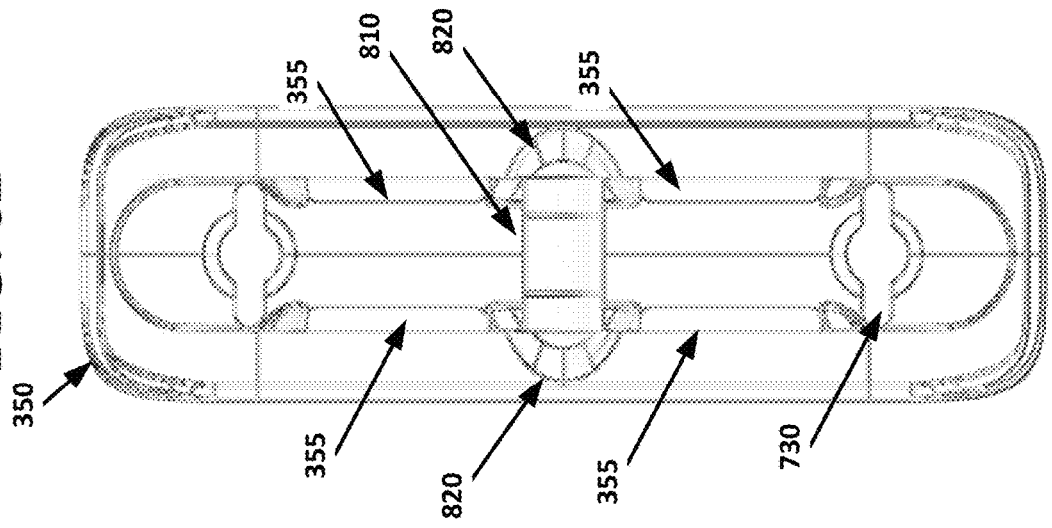
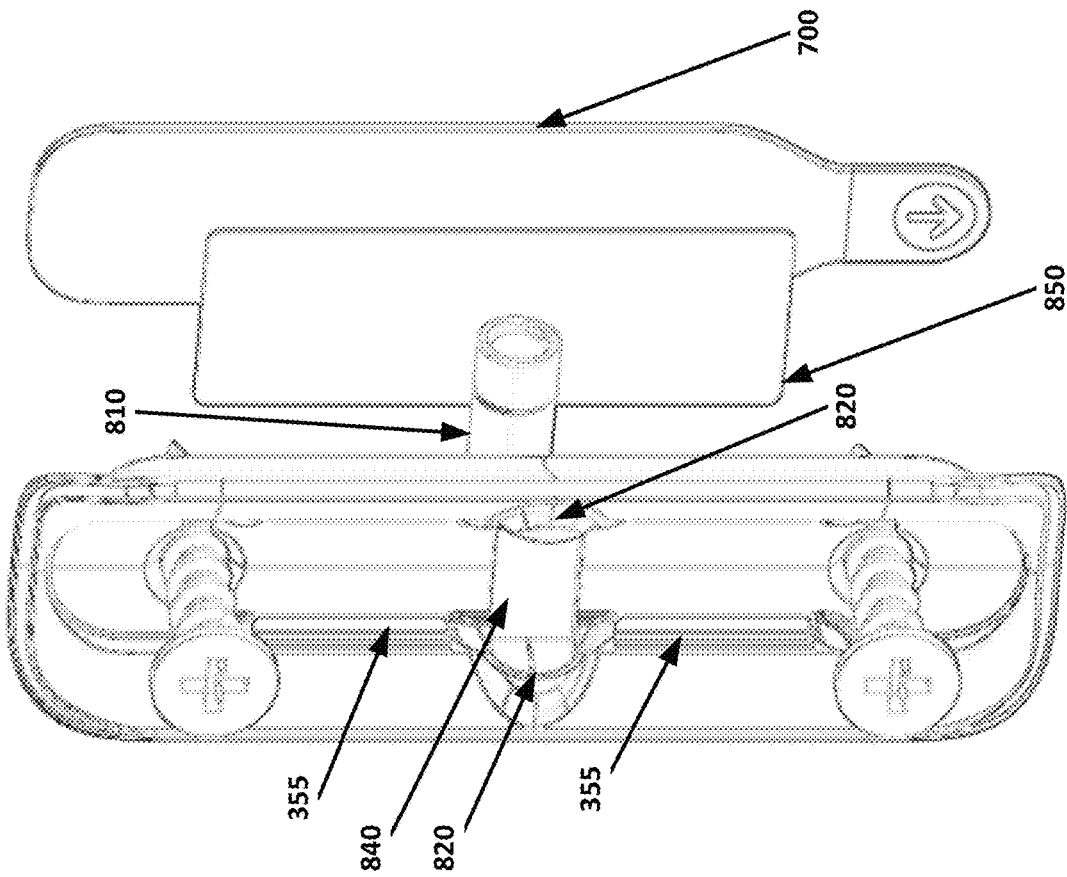

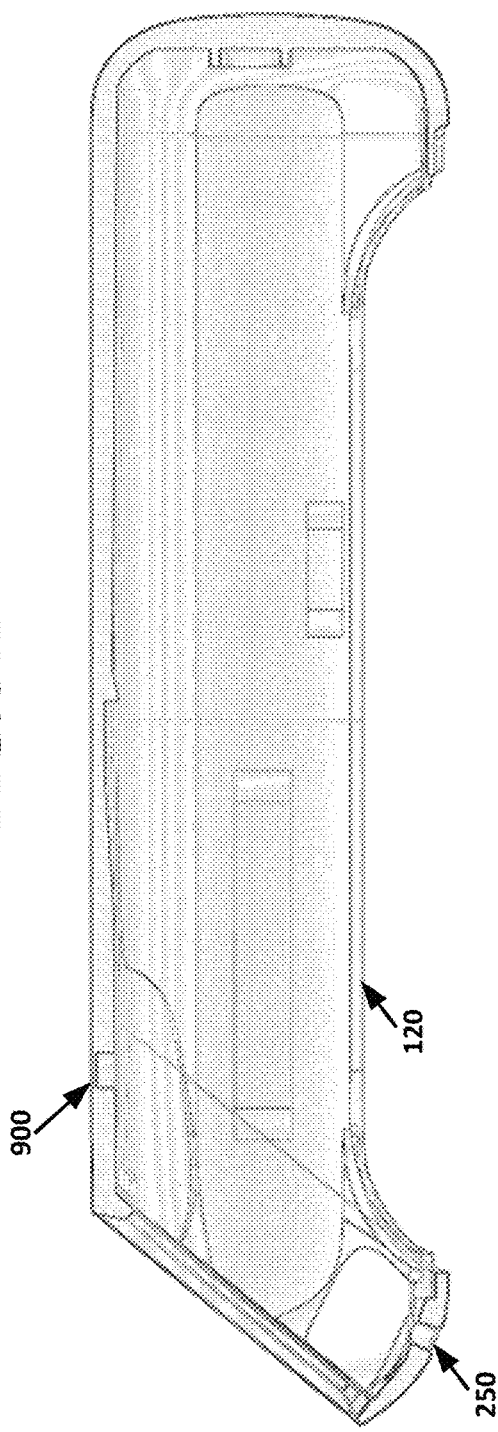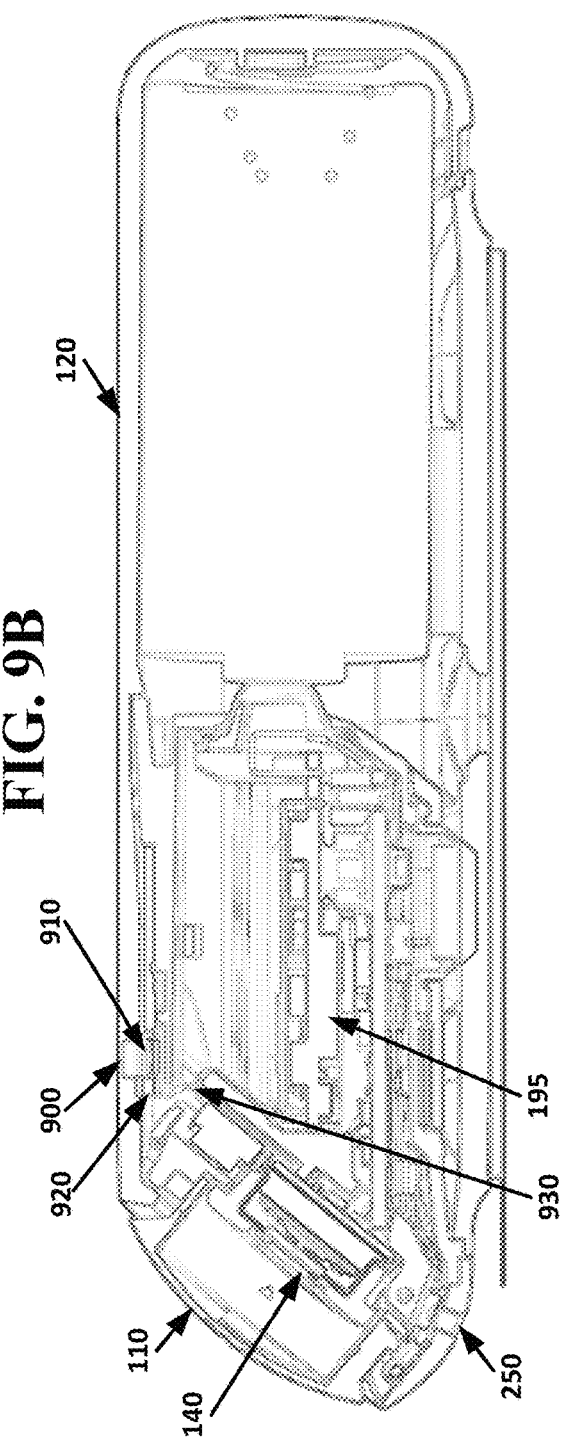

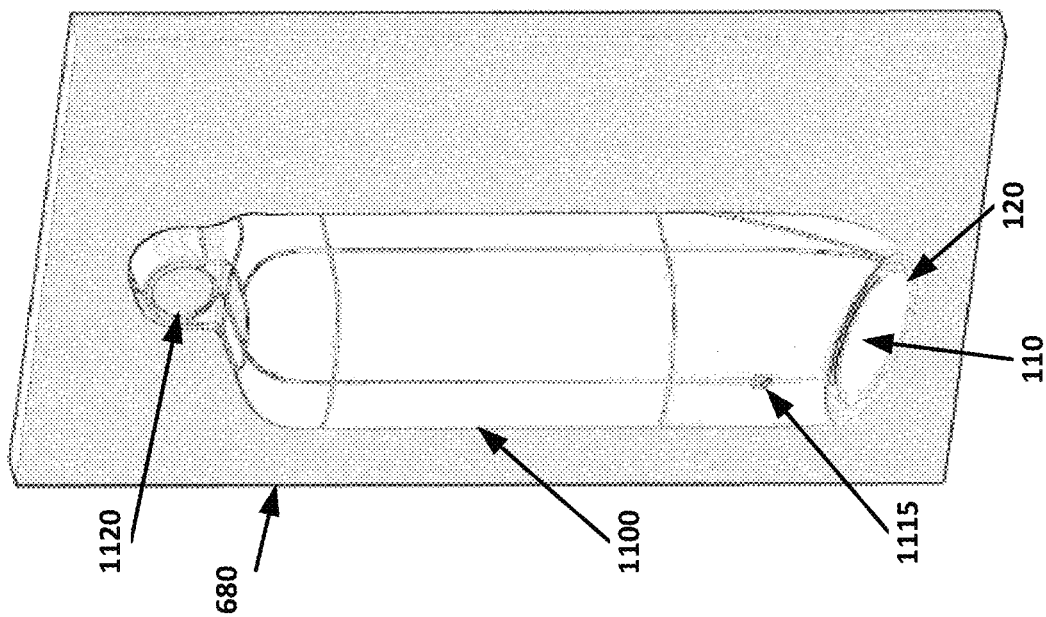
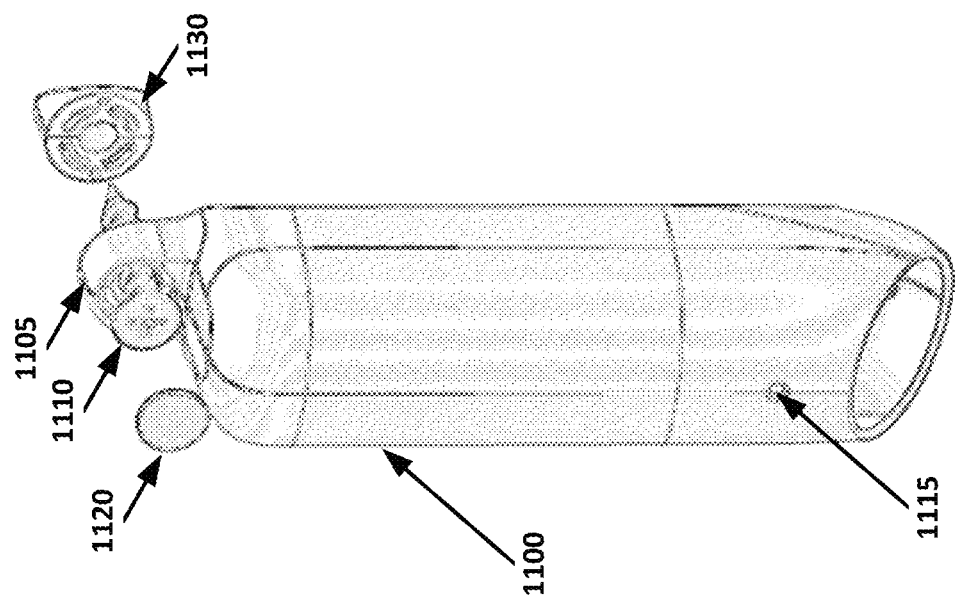

PASSIVE INFRARED SENSOR DEVICE

CROSS-REFERENCE TO RELATED APPLICATIONS

This application is a continuation of U.S. application Ser. No. 15/876,824, filed Jan. 22, 2018, which is hereby incorporated by reference in its entirety for all purposes.

BACKGROUND

Sensor devices may include sensors inside of a housing. The housing may also include user interface elements to allow for control of the sensor device. The type of sensors and user interface devices within and on a housing for a sensor device may be limited by the size of the housing. Smaller housings may include fewer or smaller sensors, and fewer or smaller user interface elements.

BRIEF SUMMARY

According to an implementation of the disclosed subject matter, an apparatus may include a housing, a lens inserted into a first opening of the housing, a metal mask covering a portion of the interior of the lens, a passive infrared (PIR) sensor underneath the lens and the metal mask, and a light pipe around the PIR sensor, the lens, and the metal mask. A portion of the light pipe may be positioned above an activation mechanism for a button.

The apparatus may include an airflow gasket around the PIR sensor. The apparatus may include a filter circuit board under the PIR sensor and connected to leads of the PIR sensor. The apparatus may include a control circuit board. The activation mechanism for the button may be on the control circuit board.

The apparatus may include a sled inside the housing. The apparatus may include a magazine inside the housing. Snaps may be formed as part of the magazine.

The housing may include a battery compartment. A retention part including a U-shaped structure, two prongs at the ends of the U-shaped structure, and a tab at the bottom of the U-shaped structure, may accommodate the insertion of a battery that is inserted into the battery compartment.

The housing may include a thinned portion. An ambient light sensor (ALS) may be located within the housing below the thinned portion of the housing.

The light pipe may include a lens for a path light. An LED for a path light may be located within the housing below the light pipe.

The apparatus may include a tamper switch, including a cap, a frame, and a detect switch. The cap may be positioned to push down the detect switch when pressed against a surface and release the detect switch when not pressed against a surface. A temperature and humidity sensor may be located within the housing beneath a second opening in the housing.

The apparatus may include a backplate. The backplate may include a slot for attachment to a snap of a magazine located in the housing. An adhesive strip may be attached to a back of the backplate and a pull tab of the adhesive strip may be pulled through a slot of the backplate to the front of the backplate.

The backplate may include a slot and crush ribs for a bubble level. The bubble level may be located in between crush ribs at the location of the slot.

The apparatus may include a corner backplate. The corner backplate may include a slot for attachment to a snap of a magazine located in the housing. An adhesive strip may be attached to a first plane of the corner backplate. A second plane of the corner backplate may be perpendicular to the first plane of the corner backplate. A magazine and housing may attach to the corner backplate in between the first plane and the second plane.

The apparatus may include a sleeve. The sleeve may cover the housing. The sleeve may include a screw hole.

An apparatus may include a sensor device. The sensor device may include a sensor device. The sensor device may include a housing including a first opening at an angle at a first end of the housing and a second opening on the body of the housing. The sensor device may include a button assembly including a lens, a metal mask covering a portion of the interior of the lens, a passive infrared (PIR) sensor underneath the lens and the metal mask, a light pipe around the PIR sensor, the lens, and the metal mask, where a portion of the light pipe positioned above an activation mechanism for a button, and an airflow gasket around the PIR sensor. The lens and the light pipe may partially cover the first opening of the housing. The sensor device may include a magazine located in the housing. The magazine may include two snaps protruding from the magazine through the second opening in the housing. A tamper switch may be attached between the snaps of the magazine. The sensor device may include a sled located in the magazine within the housing. An upper main circuit board and a lower main circuit may be attached to the sled above and below a main body of the sled. A filter circuit board and control circuit board may be attached to an angled portion of the sled below the PIR sensor.

The apparatus may include a backplate. The backplate may include two slots. The slots may accommodate the snaps of the magazine of the sensor device to attach the sensor device to the backplate. The backplate may cover the second opening of the housing and presses the tamper switch when the sensor device is attached to the backplate.

An ambient light sensor (ALS) may be located below a thinned portion of the housing of the sensor device.

The sled may include knuckles. The light pipe may include end knuckles. The knuckles of the sled, the end knuckles of the light pipe, and a pin, may form a hinge.

An apparatus for a sensor device may include a temperature and humidity sensor. The temperature and humidity sensor may be connected to a sled below a filter circuit board. The apparatus may include a housing for the sensor device.

The housing for the sensor device may include an opening which may be permeable to the atmosphere outside of the housing. The temperature and humidity sensor may be located near the opening.

An apparatus for a sensor device may include light emitting devices. The light emitting devices may be located within the sensor device.

One of the light emitting devices of the sensor device may be path light. The path light may be located between a housing of the sensor device and a light pipe of the sensor device located within the housing. The light pipe may include a lens for the path light.

An apparatus for a sensor device may include snaps. The snaps may be an integral component of a magazine of the sensor device. The sensor device may include two or more snaps. The magazine may be located within a housing for the sensor device such that the snaps are exposed through an opening of the housing.

The snaps may be protrusions from the magazine that may extend beyond the housing. Each snap may include a raised portion which may be thicker than the remainder of the snap.

The snaps may fit into slots of a backplate for the sensor device. The fit between the snaps and the slots of the backplate may be friction fit. The snaps may hold the magazine onto the backplate when the snaps are inserted into the slots of the backplate. The magazine may be attached to the housing of the sensor device, which may be held onto the backplate by the magazine and the snaps. The depth of the slots in the backplate may be equal to or greater than the length of the snaps. The snaps may not protrude through the slots when the snaps are inserted into the slots.

An apparatus for a sensor device may include a battery retention mechanism. The battery retention mechanism may include a retention part. The retention part may have a U-shape, and may include two prongs and tab.

Each prong may be located on one end of the U-shape of the retention part, and may extend away from the U-shaped structure.

The tab may be located at the bottom of the U-shape of the retention part and may extend away from the U-shaped structure. The tab may extend away from the U-shaped structure of the retention part in the opposite direction of the two prongs.

The retention part may accommodate the insertion of a battery in the U-shaped structure between the two prongs.

The retention part may be inserted into a battery compartment of the sensor device with the tab inserted into a slot in the battery compartment.

An apparatus for a sensor device may include a battery compartment including battery connectors. The battery connectors may include a hat which may be positioned within the battery compartment to contact the positive terminal of a battery inserted into the battery compartment. The hat may be connected to a spring which may be electrically connected to a circuit board of the sensor device.

The battery connectors may include a coil spring which may be positioned within the battery compartment to contact the negative terminal of a battery inserted into the battery compartment. The coil spring may be connected to a strip that includes conductive material. The strip that includes conductive material may connect to a spring at the opposite end of the strip from the coil spring. The spring may be electrically connected to the circuit board. The connection between the spring and the main circuit board may include a screw which may secure the spring to the circuit board.

An apparatus for a sensor device may include a tamper switch. The tamper switch may include a detect switch, a frame, and a cap.

The detect switch may be located on a circuit board. The detect switch may have an open position and closed position. The detect switch may go from the open position to the closed position when the detect switch is pushed in a threshold distance. The detect switch may be in the open position when the detect switch has not been pushed in the threshold distance.

The cap may be located over the detect switch. The cap may include a plunger located on the underside of the cap. The plunger may apply force to the detect switch when the cap is pushed in. The cap may include a flexible material.

The frame may be placed around the cap when the cap is covering the detect switch. The frame may hold the cap onto the circuit board. The frame may include a rigid material. The frame may cover a portion of the circuit board.

The tamper switch may be located in an opening of the housing of the sensor device. The tamper switch may be located such that placing the sensor device on a backplate pushes the cap in such that the plunger causes the detect switch to enter the closed position. The tamper switch may be located such that removing the sensor device from a backplate causes the detect switch to enter the open position.

The position of the tamper switch may indicate whether the sensor device is attached to a backplate. The sensor device may determine that the sensor device is not attached to the backplate when the tamper switch is in the open position.

A backplate for a sensor device may include a slot and an adhesive strip that may include adhesive stretch and release material and a pull tab. The adhesive strip may be attached to the back of the backplate such that the adhesive stretch and release material is exposed. The backplate may be attached to a surface using the exposed adhesive stretch and release material.

The pull tab may be pulled through the slot such that the pull tab is accessible on the opposite side of the backplate from the adhesive stretch and release material. Pulling the pull tab may release the adhesive stretch and release material. Attaching a sensor device to the backplate may cover the pull tab.

A backplate for a sensor device may include a bubble level. The backplate may include crush ribs which may hold the bubble level. The backplate may include a slot through which the bubble level may be inserted into the crush ribs of the backplate. The backplate may include a liner which may cover the slot through which the bubble has been inserted. Attaching a sensor device to the backplate may cover the bubble level.

An apparatus for a sensor device may include an ambient light sensor and a housing including walls. The ambient light sensor may be located within the housing proximate to a portion of a wall of the housing may be thinned such that ambient light may reach the ambient light sensor through the portion of the wall of the housing that has been thinned.

The portion of the wall of the housing may thinned by removing material from the interior of the wall of the housing. A CNC machine tool may be used to thin the portion of the wall of the housing. The housing may be made of polycarbonate.

A corner backplate for a sensor device may be prism shaped. A first plane of the prism of the corner backplate may be open to accommodate the insertion of a sensor device. A second plane of the prism of the corner backplate may include adhesive strip with exposed material to attach the corner backplate to a surface when the sensor device is inserted into the corner backplate at the first plane. A third plane of the prism of the corner backplate may be at an angle to the first plane and the second plane such that when the corner backplate is attached to a surface the third plane is at a 45-degree angle to the surface.

The second plane and the third plane of the prism of the corner backplate may include slots. The slots may accommodate snaps of the sensor device. The snaps of the sensor device may attach the sensor device to corner backplate at the slots when the sensor device is inserted into the opening of the first plane of the prism of the corner backplate.

An apparatus for a sensor device may include a sleeve that may cover the sensor device. The sleeve may cover a sensor device that is attached to backplate which is attached to a surface such that only a portion of the front of the sensor device may be visible at an opening of a front side of the sleeve. A backside of the sleeve may be open to allow the sleeve to be inserted over the sensor and the backplate while the backplate is attached to a surface. The sleeve may include a screw hole which may accommodate a screw. The screw hole may be against or proximate to a surface when the sleeve covers a sensor device that is attached to a backplate that is attached to the surface. The screw may attach the sleeve to the surface through the screw hole. A sleeve covering a sensor device and a backplate and attached to surface with a screw may not be removed from the sensor device and the backplate without removal of the screw.

Additional features, advantages, and implementations of the disclosed subject matter may be set forth or apparent from consideration of the following detailed description, drawings, and claims. Moreover, it is to be understood that both the foregoing summary and the following detailed description provide examples of implementations and are intended to provide further explanation without limiting the scope of the claims.

BRIEF DESCRIPTION OF THE DRAWINGS

The accompanying drawings, which are included to provide a further understanding of the disclosed subject matter, are incorporated in and constitute a part of this specification. The drawings also illustrate implementations of the disclosed subject matter and together with the detailed description serve to explain the principles of implementations of the disclosed subject matter. No attempt is made to show structural details in more detail than may be necessary for a fundamental understanding of the disclosed subject matter and various ways in which it may be practiced.

FIG. 6A shows an example arrangement suitable for a sensor device according to an implementation of the disclosed subject matter.

FIG. 6B shows an example arrangement suitable for a sensor device according to an implementation of the disclosed subject matter.

FIG. 6C shows an example arrangement suitable for a sensor device according to an implementation of the disclosed subject matter.

FIG. 6D shows an example arrangement suitable for a sensor device according to an implementation of the disclosed subject matter.

FIG. 6E shows an example arrangement suitable for a sensor device according to an implementation of the disclosed subject matter.

FIG. 7A shows an example arrangement suitable for a sensor device according to an implementation of the disclosed subject matter.

FIG. 7B shows an example arrangement suitable for a sensor device according to an implementation of the disclosed subject matter.

FIG. 7C shows an example arrangement suitable for a sensor device according to an implementation of the disclosed subject matter.

FIG. 7D shows an example arrangement suitable for a sensor device according to an implementation of the disclosed subject matter.

FIG. 8A shows an example arrangement suitable for a sensor device according to an implementation of the disclosed subject matter.

FIG. 8B shows an example arrangement suitable for a sensor device according to an implementation of the disclosed subject matter.

FIG. 9A shows an example arrangement suitable for a sensor device according to an implementation of the disclosed subject matter.

FIG. 9B shows an example arrangement suitable for a sensor device according to an implementation of the disclosed subject matter.

FIG. 11A shows an example arrangement suitable for a sensor device according to an implementation of the disclosed subject matter.

FIG. 11B shows an example arrangement suitable for a sensor device according to an implementation of the disclosed subject matter.

DETAILED DESCRIPTION

Sensor devices as disclosed herein may have a variety of uses, for example within a smart home, premises monitoring or security systems, or similar environments. As disclosed in further detail herein, one or more sensors, user interface elements, and other components may be integrated within a sensor device, such as within and/or on the surface of a housing of the sensor device.

Figure 1A:
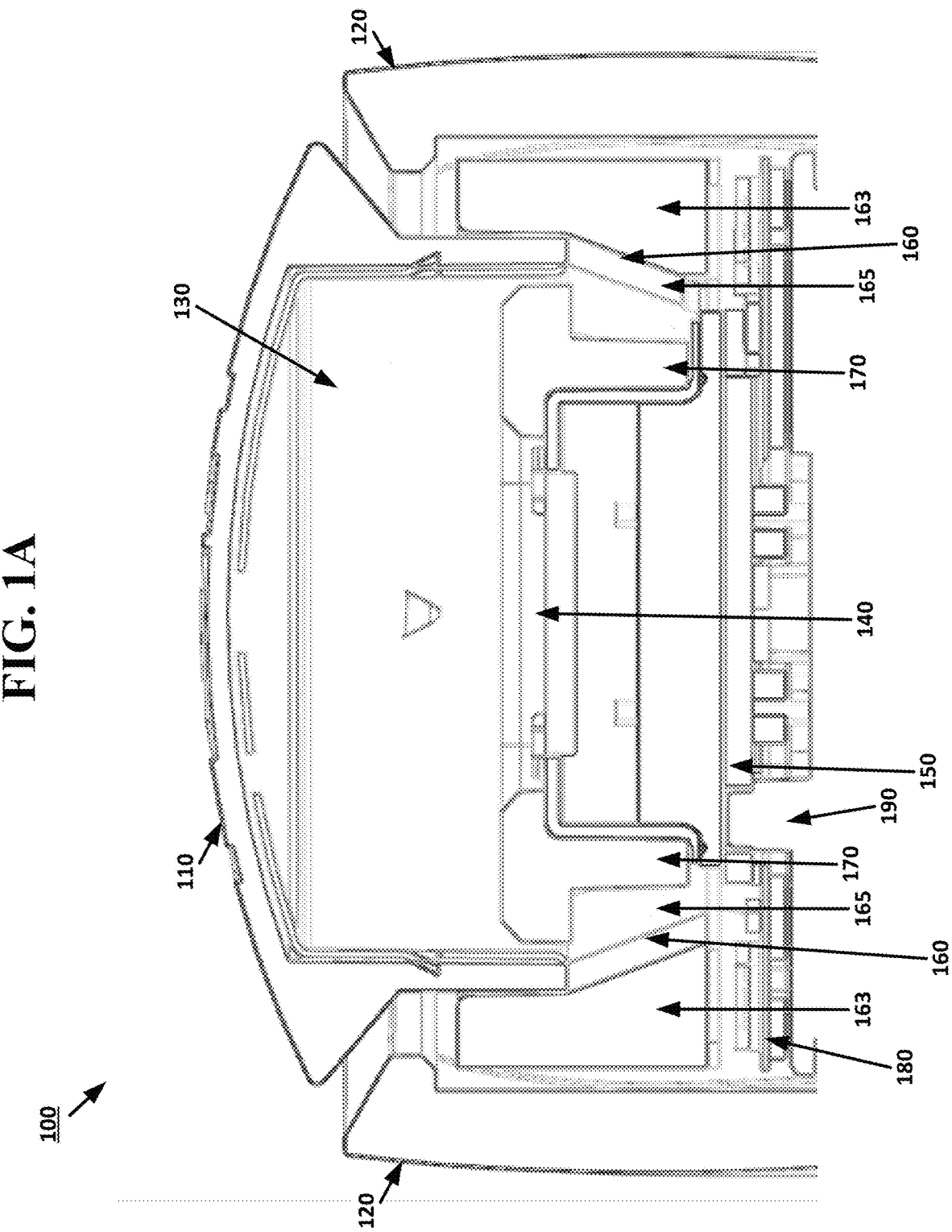
FIG. 1A shows an example arrangement suitable for a sensor device according to an implementation of the disclosed subject matter.
Figure 1B:
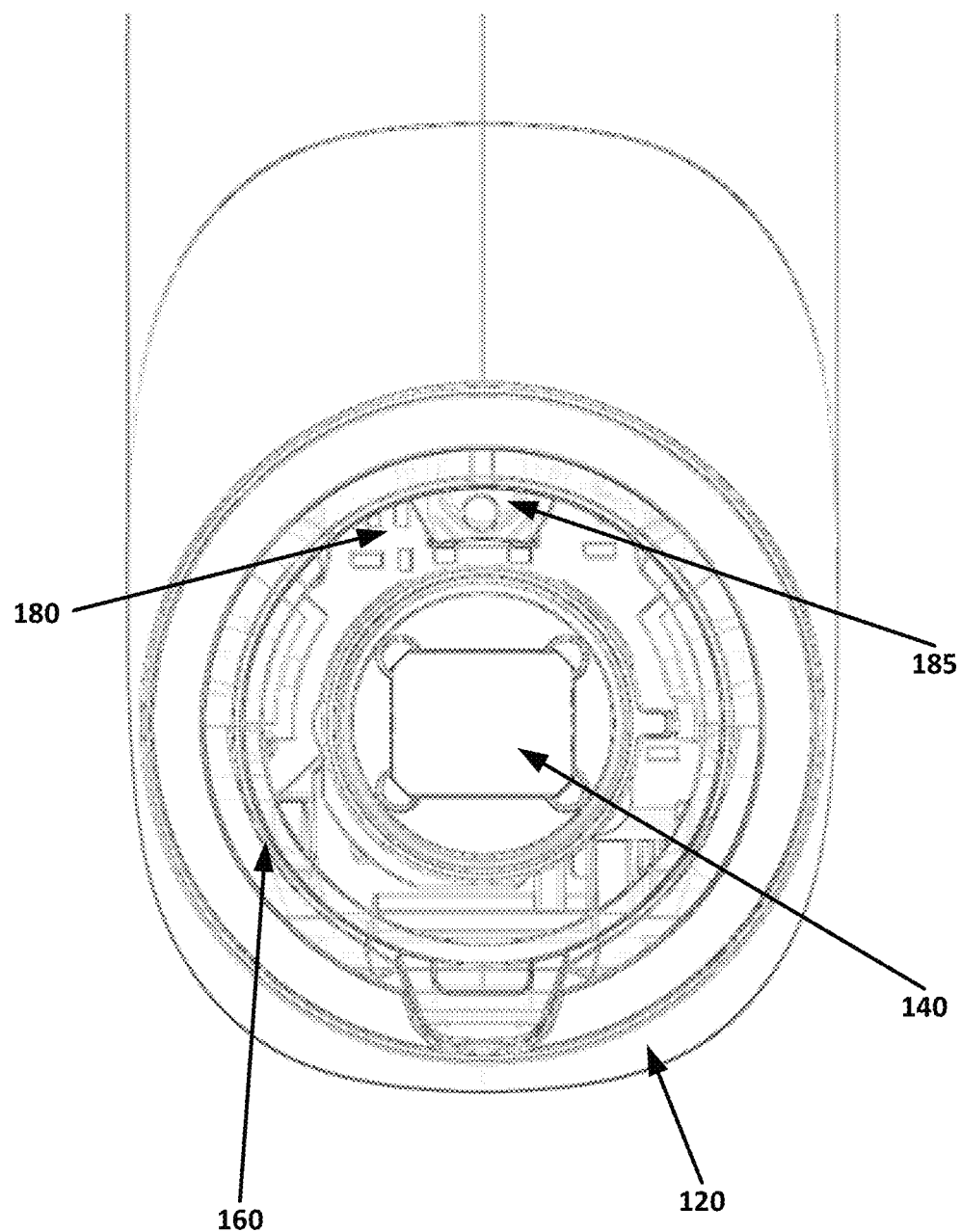
FIG. 1B shows an example arrangement suitable for a sensor device according to an implementation of the disclosed subject matter.
Figure 1C:
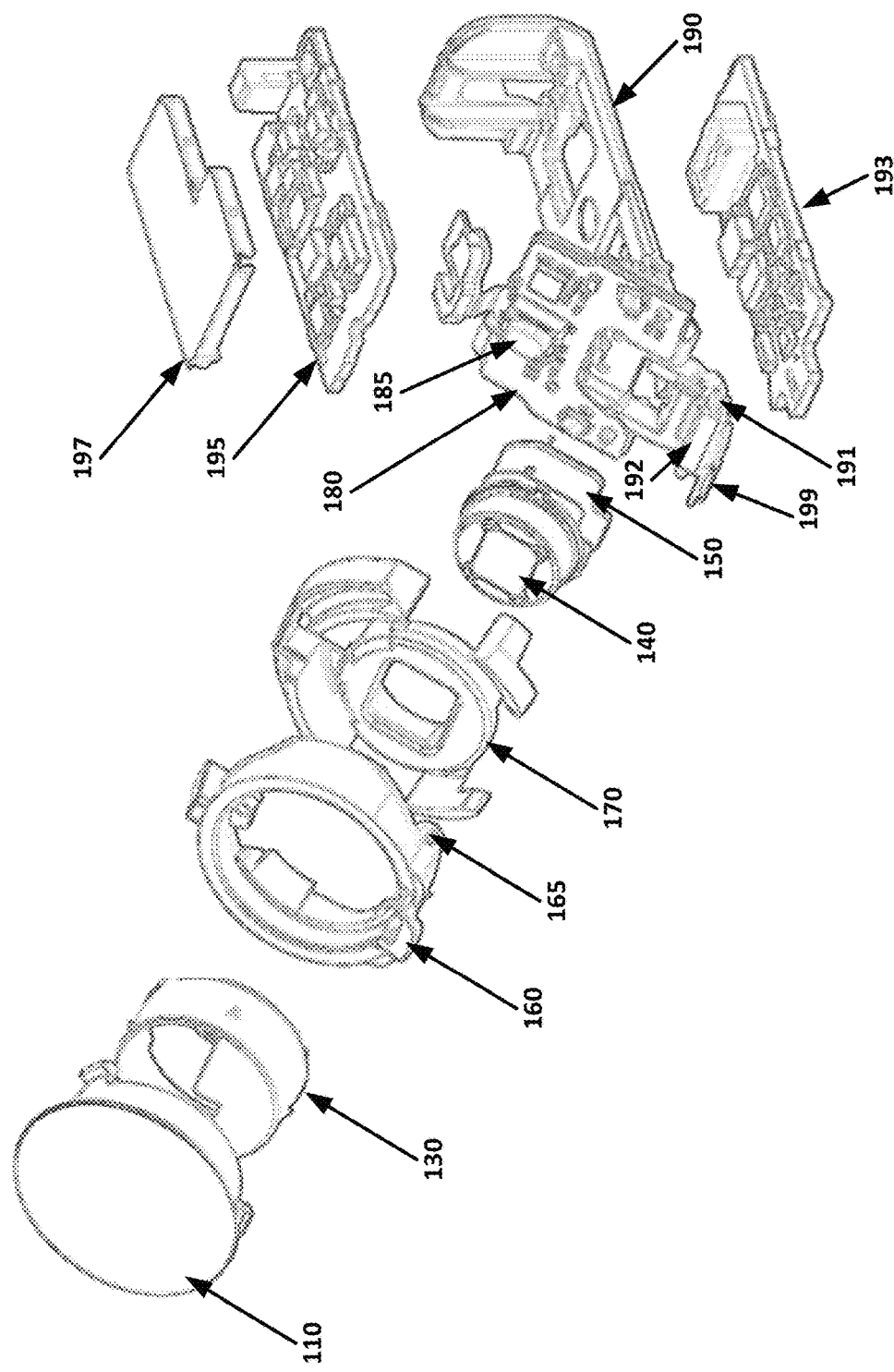
FIG. 1C shows an example arrangement suitable for a sensor device according to an implementation of the disclosed subject matter.
Figure 2A:
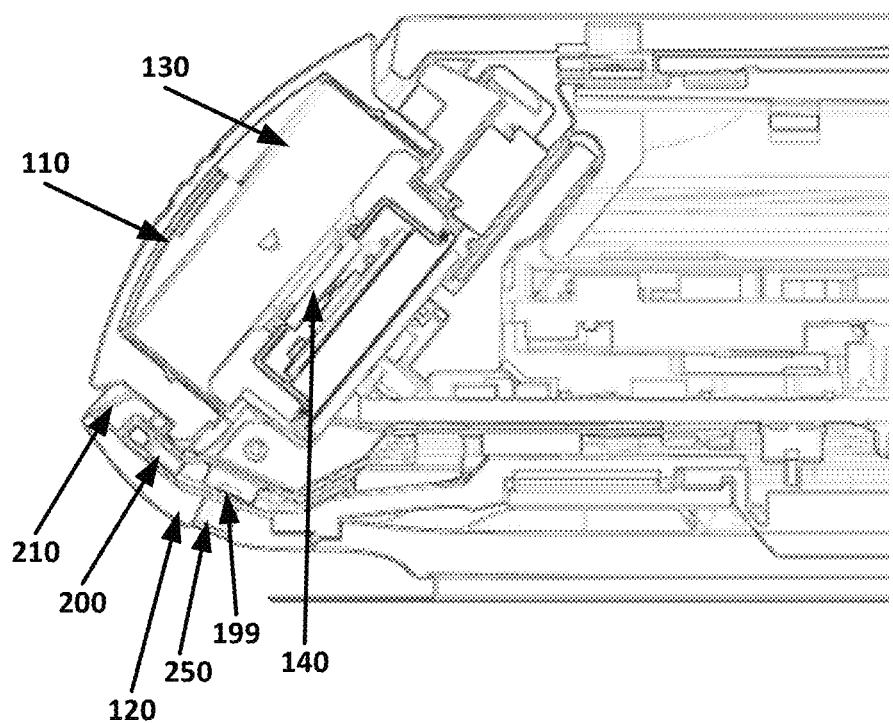
FIG. 2A shows an example arrangement suitable for a sensor device according to an implementation of the disclosed subject matter.
Figure 2B:
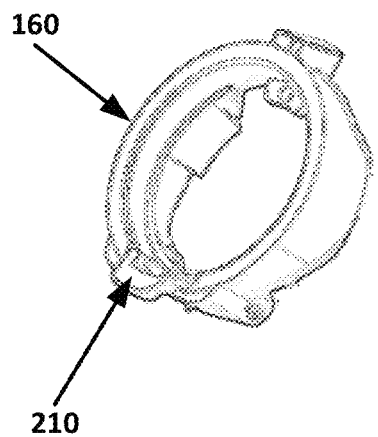
FIG. 2B shows an example arrangement suitable for a sensor device according to an implementation of the disclosed subject matter.
Figure 2C:
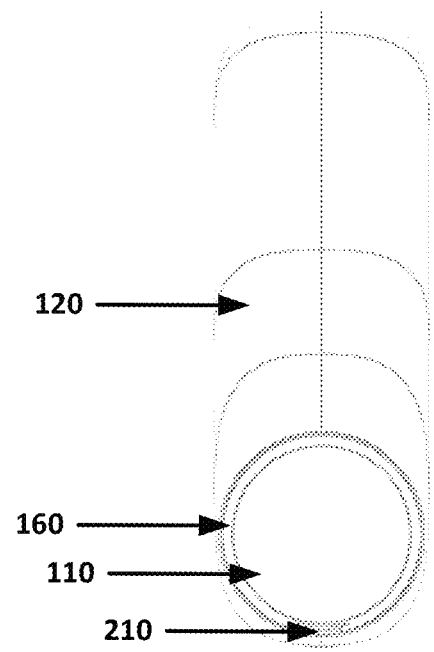
FIG. 2C shows an example arrangement suitable for a sensor device according to an implementation of the disclosed subject matter.
Figure 3A:
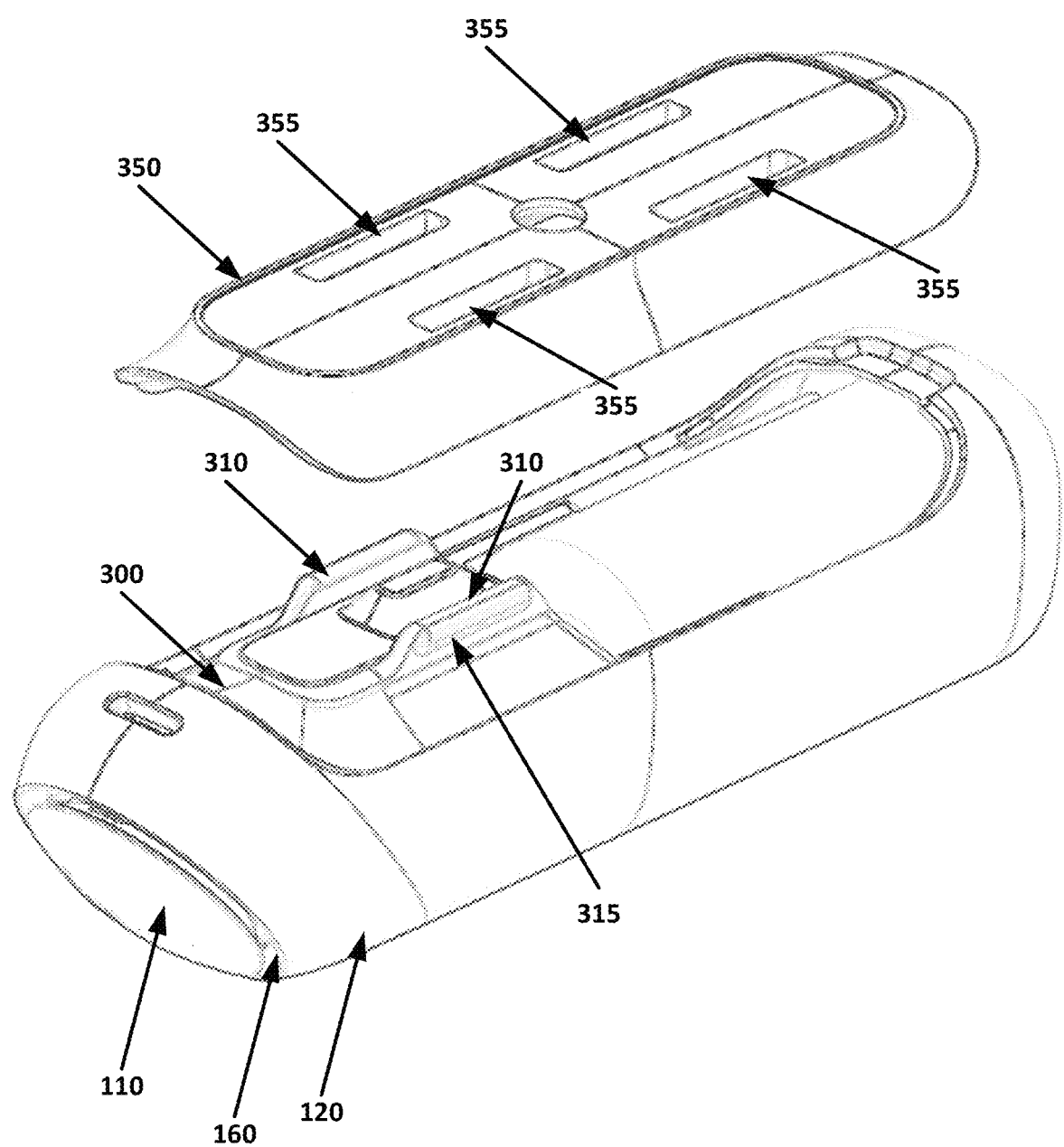
FIG. 3A shows an example arrangement suitable for a sensor device according to an implementation of the disclosed subject matter.
Figure 3B:
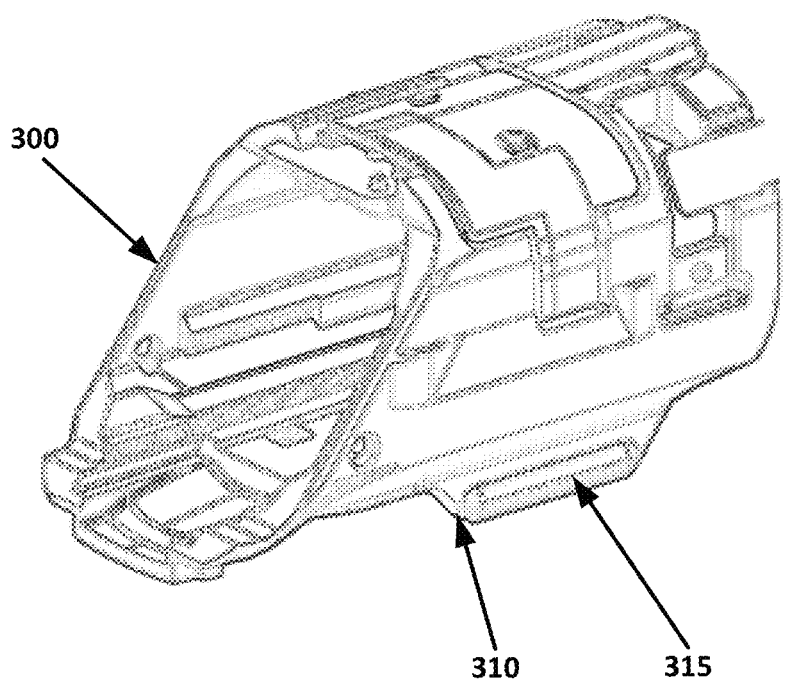
FIG. 3B shows an example arrangement suitable for a sensor device according to an implementation of the disclosed subject matter.
Figure 3C:
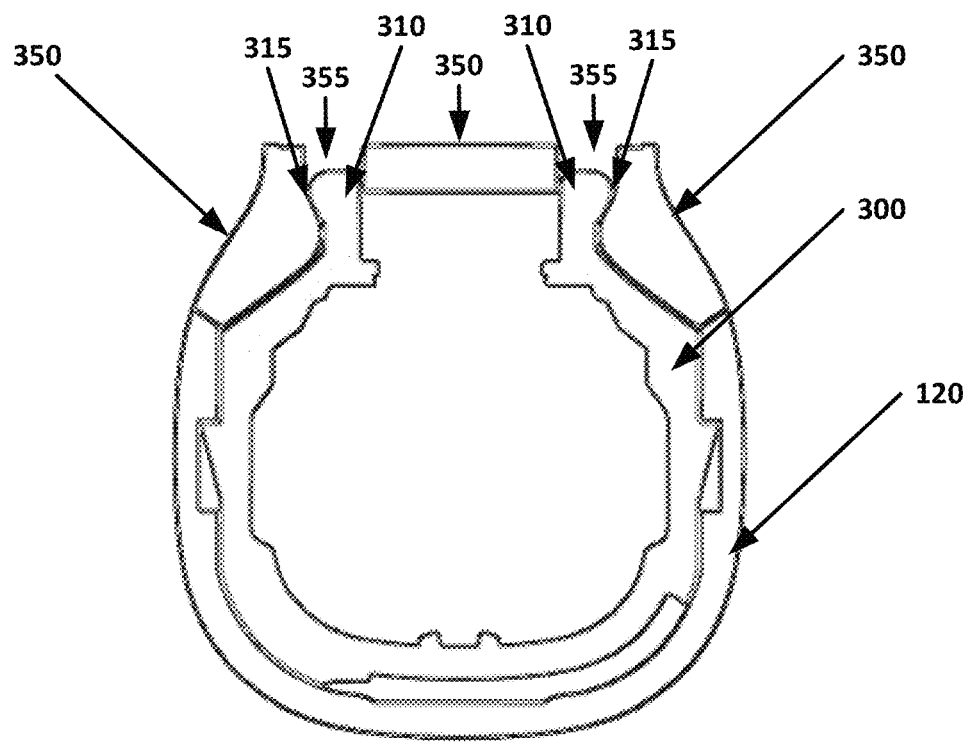
FIG. 3C shows an example arrangement suitable for a sensor device according to an implementation of the disclosed subject matter.
Figure 4A:
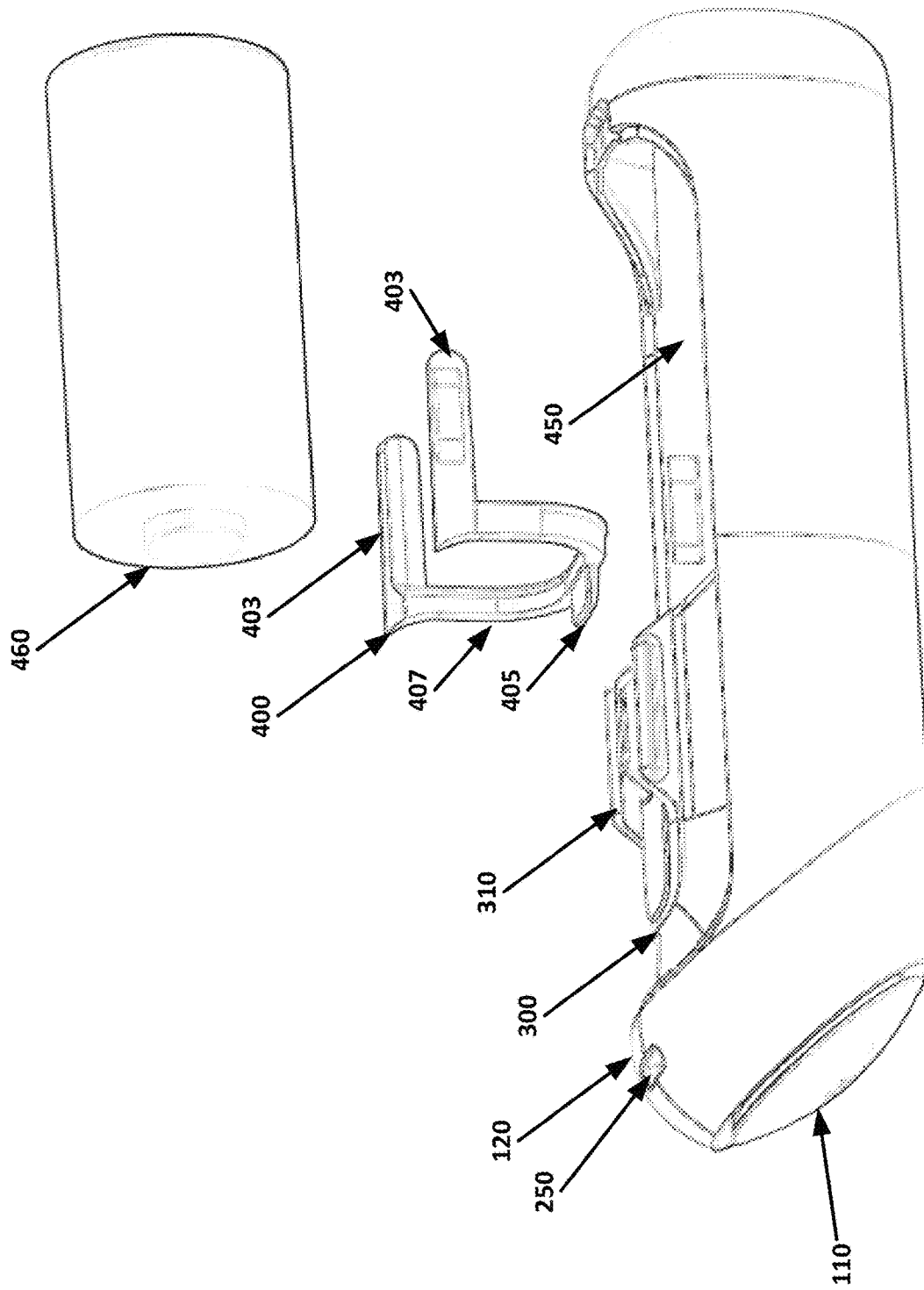
FIG. 4A shows an example arrangement suitable for a sensor device according to an implementation of the disclosed subject matter.
Figure 4B:
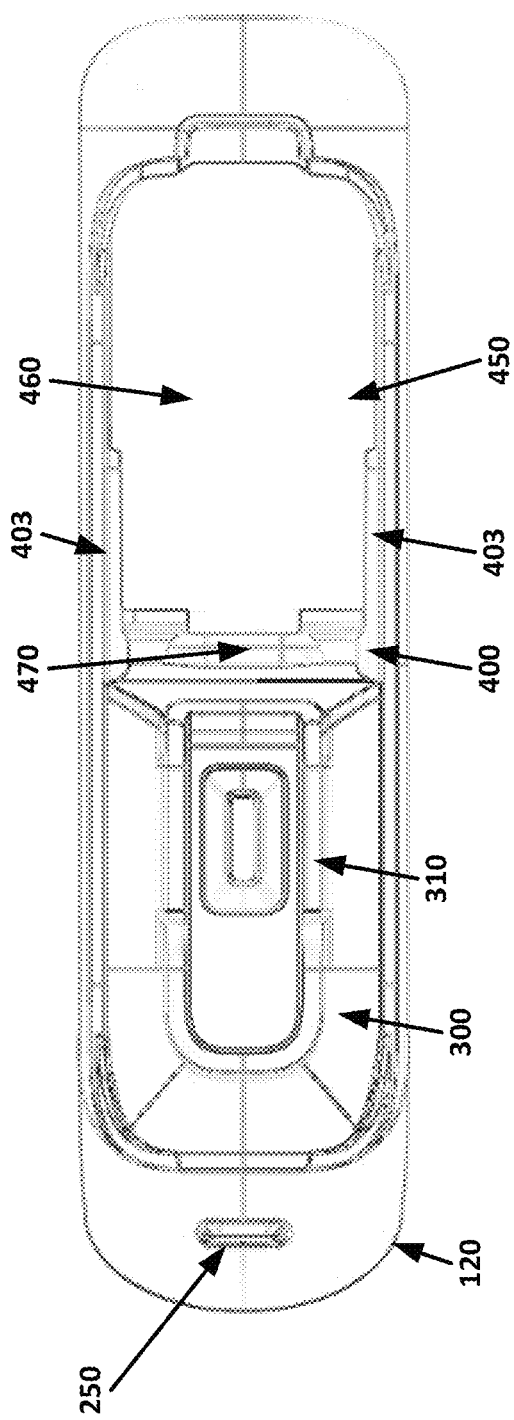
FIG. 4B shows an example arrangement suitable for a sensor device according to an implementation of the disclosed subject matter.
Figure 5:
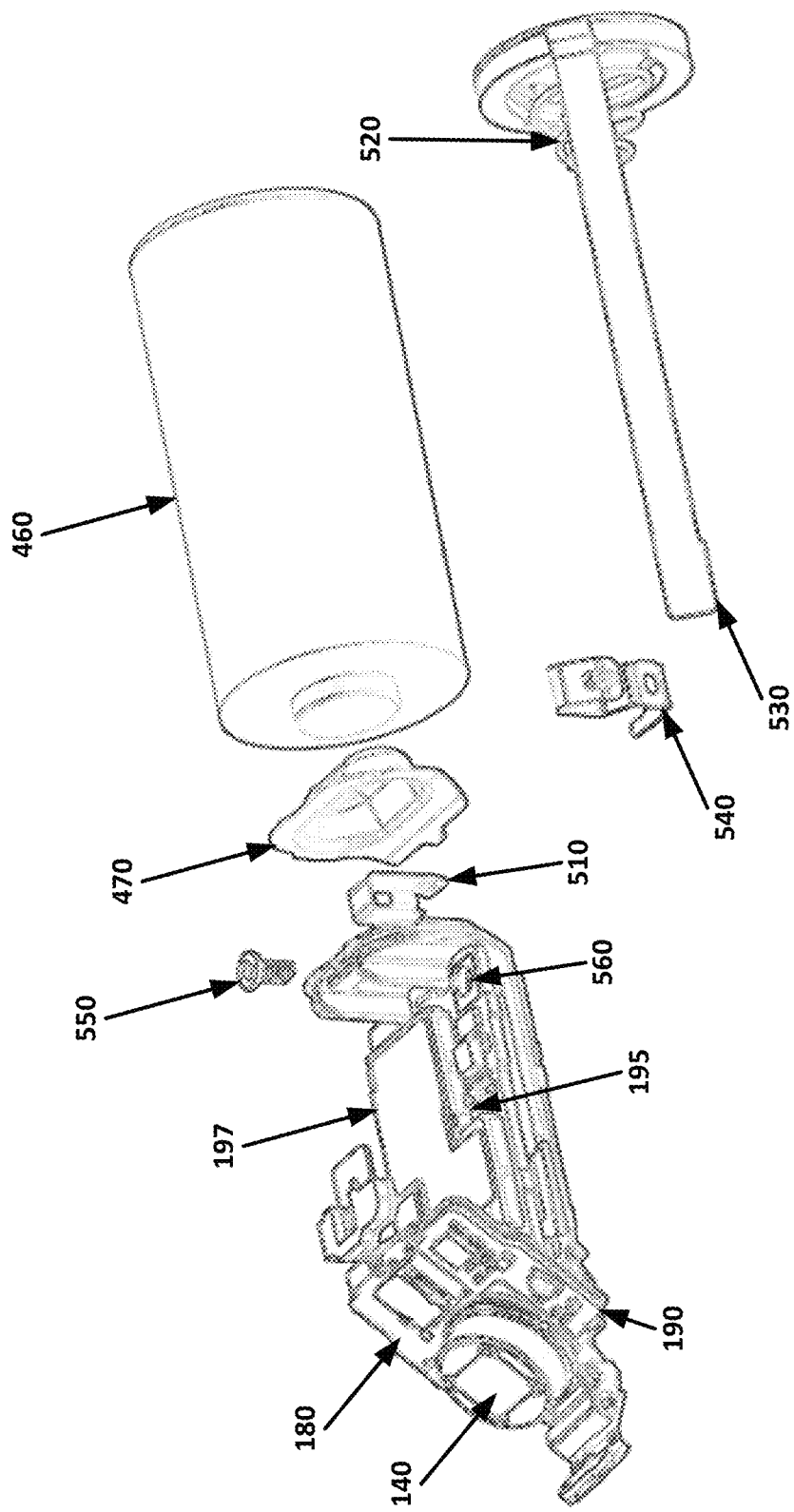
FIG. 5 shows an example arrangement suitable for a sensor device according to an implementation of the disclosed subject matter.
Figure 10B:
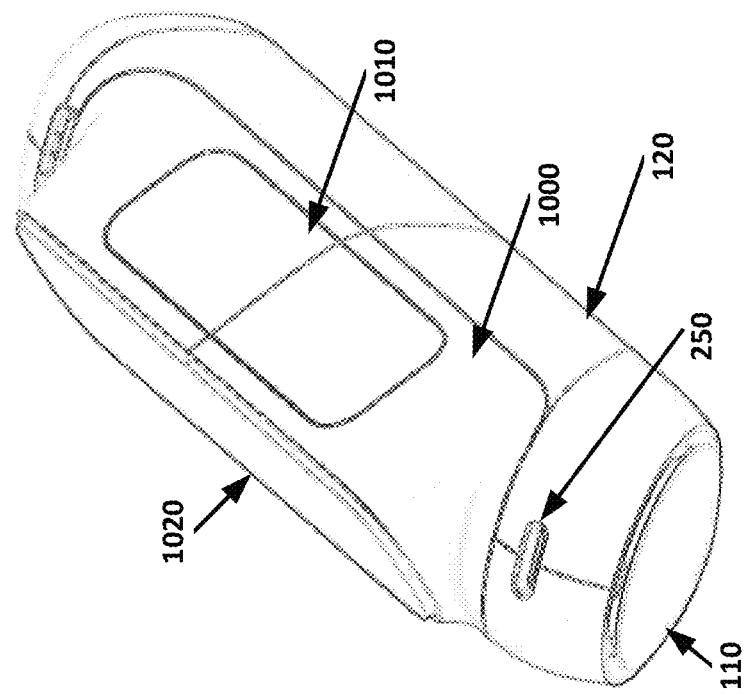
FIG. 10B shows an example arrangement suitable for a sensor device according to an implementation of the disclosed subject matter.
Figure 10A:
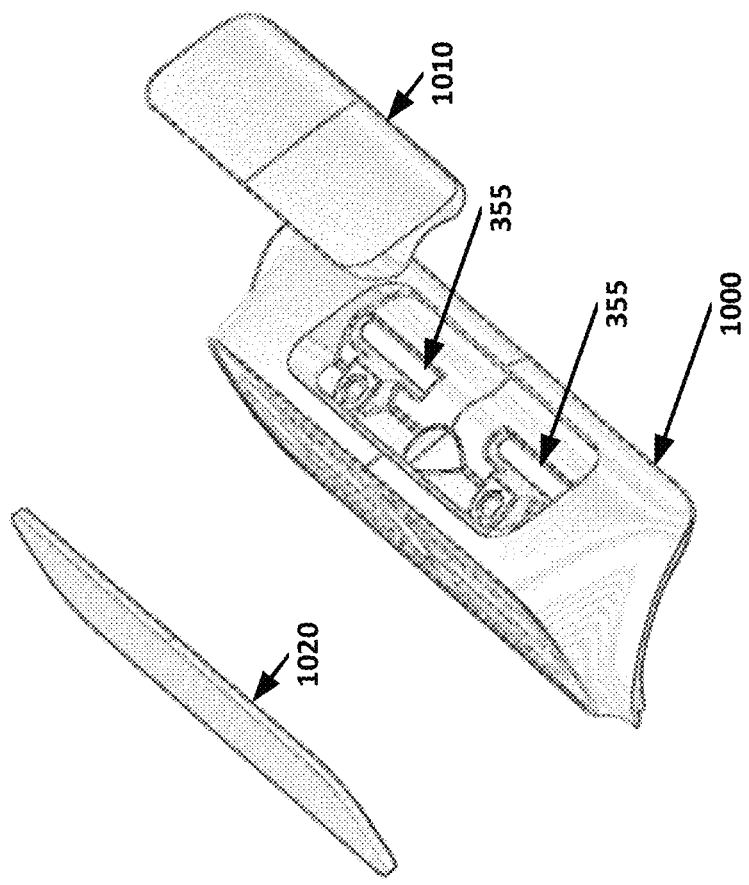
FIG. 10A shows an example arrangement suitable for a sensor device according to an implementation of the disclosed subject matter.

A sensor device may include one or more sensors, including a passive infrared sensor (PIR), an ambient light sensor (ALS), and a temperature and humidity sensor, for example as shown in FIGS. 1A-1C and as described in further detail below. The sensor device may also include a tactile switch or button, which may be integrated with the PIR, for example as shown in FIGS. 1A-1C and as described in further detail below. The PIR may include a metal mask which may partially cover the inside of the lens of the PIR. The PIR may be attached to both a circuit board under the PIR sensor and to a main circuit board, for example as shown in FIGS. 1A-1C and as described in further detail below. The sensor device may also include one or more light emitting devices, such as light emitting diodes (LEDs), which may be arranged on and/or within the sensor device so that their emitted light is visible outside of a housing of the sensor device, for example as shown in FIGS. 2A-2C and as described in further detail below. A LED may act as a path light, for example in a smart home or similar environment. The sensor device may include snaps which may be used to attach the housing of the sensor device to a backplate, for example as shown in FIGS. 3A-3C and as described in further detail below. The battery compartment of the housing of the sensor device may include a battery retention mechanism, for example as shown in FIGS. 4A-4B and as described in further detail below. The battery compartment may also include battery connectors that may allow for the connection between the battery and the components of the sensor device to be contained in a smaller space, for example as shown in FIG. 5 and as described in further detail below. The housing of the sensor device may include a tamper switch which may operate in conjunction with the backplate, for example as shown in FIGS. 6A-6E and as described in further detail below. The backplate may include an adhesive strip with a pull tab that may not be visible when the housing of the sensor device is attached to the backplate, for example as shown in FIGS. 7A-7D and as described in further detail below. The backplate may include a bubble level, for example as shown in FIGS. 8A-8B and as described in further detail below. The ALS may be positioned within the housing of the sensor device at a location where the wall of the housing has been thinned, for example as shown in FIGS. 9A-9B and as described in further detail below. A corner backplate may allow the sensor device to be installed in the corner of a room, for example as shown in FIGS. 10A-10C and as described in further detail below. A sleeve may be used to cover the sensor device, for example as shown in FIGS. 11A-11B and as described in further detail below.

The PIR of the sensor device may be integrated with the tactile switch or button of the sensor device. The lens of the PIR may serve as a contact point for a person to push to use the button or tactile switch of the sensor device. The PIR may be located underneath the lens. The lens may be in contact with a light pipe which may also serve as a light guide for an LED. The light pipe may be in contact with an airflow gasket, which may have cutouts to accommodate the light pipe. The light pipe may include metal hinges. The light pipe may be hollow-shaped, for example, ring shaped, and the airflow gasket may include a cutout at its center to allow for a line-of-sight from the PIR to the lens. The airflow gasket may be positioned to fill space around the PIR that is not filled by the light pipe, lens, or a metal mask which may be partially within the lens. The airflow gasket may prevent hot air from entering the sensor device to avoid false positive readings from the PIR.

The PIR may be attached to a filter circuit board which may perform filtering functions for the PIR. The filter circuit board may be any suitable printed circuit board of any suitable size and shape. The filter circuit board may be, for example, 0.5 mm thick. Leads of the PIR may be connected to the filter circuit board. A grounding adhesive may be placed in between the PIR and the filter circuit board. The filter circuit board may be accommodated in a cutout in a control circuit board that may include the activation mechanism of the button or tactile switch. When a user pushes down on the lens, this may push the light pipe downwards, and a part of the light pipe may push down on the activation mechanism of the button or tactile switch. This may allow the lens and PIR to be part of the button or tactile switch of the sensor device, as pushing down on the lens of the PIR may cause the light pipe to activate the activation mechanism of the button or tactile switch.

The PIR may include a metal mask which may partially cover the inside of the lens of the PIR. The metal mask may be located underneath the lens, and may cover, for example, half of the lens. The metal mask may have any suitable shape. The metal mask may be contained within the lens and the light pipe. The metal mask may, for example, provide rigidity to the lens, which may be made of a soft material. The metal mask may cause the PIR to not detect the movement of certain heat sources, for example, heat sources that may be low to the ground in a room, such as animals.

Leads of the PIR may be connected to the filter circuit board, and may pass through the filter circuit board to be connected directly to a main circuit board of the sensor device. The lens, light pipe, PIR, filter circuit board, and control circuit board may be arranged at an angle to the main circuit board. A sled, which may be, for example, plastic, may hold the control circuit board at angle, and may include holes which may allow the leads of the PIR to pass through and connect to the main circuit board. The main circuit board may include two pieces, such as an upper main circuit board which may be located above the base of the sled, and a lower main circuit board which may be located below the base of the sled. The leads of the PIR may connect to the lower main circuit board.

The temperature and humidity sensor may be connected to the sled below the filter circuit board on the angled portion of the sled. The housing of the sensor device may include an opening which may be permeable to atmosphere outside of the housing. The temperature and humidity sensor may be positioned near the opening so that it may detect the temperature and humidity of the environment outside of the housing of the sensor device.

The sensor device may also include one or more light emitting devices, such as light emitting diodes (LEDs), which may be arranged on and within the sensor device so that their emitted light is visible outside of a housing of the sensor device. A LED may act as a path light. The path light LED may be mounted in the sensor device in between the housing of the sensor device and the portion of the light pipe inserted into the sensor device. A lens for the path light may be attached to a lens holder formed on the light pipe, allowing light from the path light LED to exit the housing of the sensor device. The lens holder may be formed such that light from the path light LED is angled downwards toward the floor when the sensor device is mounted to a wall.

The sensor device may include snaps which may be used to attach the housing of the sensor device to a backplate. A magazine within the housing of the sensor device may hold the various components of the sensor device, such as, for example, the sled with attached circuit boards including the main circuit board, control circuit board, and filter circuit board. The magazine may be any suitable shape, such as, for example, a tube with one angled end. Snaps may be an integral component of the magazine. The snaps may be, for example, short protrusions or fins of any suitable shape, which may include a raised portion. The magazine may include any suitable number of snaps, such as, for example, two snaps. The snaps may be arranged in any suitable manner.

The snaps of the magazine may be used to attach the sensor device to a backplate. The backplate may include one or more slots which may align with the snaps of the magazine. Before or after the backplate is attached to a wall, the sensor device may be attached to the backplate by aligning the snaps of the magazine with the slots of the backplate and pushing the sensor device onto the backplate. The snaps, once inserted into the slots of the backplate, may hold the sensor device on to the backplate, for example, through friction fitting. The snaps of the magazine may not protrude through the slots of the backplate, and may be inserted into the slots to any suitable depth based on the depth of the slots and the size of the snaps. The backplate may close the housing of the sensor device, covering the magazine and the battery. The snaps may also be used to attach the sensor device to a corner backplate.

The battery compartment of the housing of the sensor device may include a battery retention mechanism. The battery retention mechanism may include a retention part. The retention part may have any suitable shape, and be made of any suitable material. For example, the retention part may include a U-shaped structure made of plastic. The retention part may include prongs at each of the U-shaped structure. The prongs may protrude away from the U-shaped structure. The retention part may also include a tab at the bottom of the curve of the U-shaped structure. The tab may protrude away from the U-shaped structure in the opposite direction from the prongs. A battery may be inserted into the retention part, with the retention part towards the positive terminal of the battery. There may be a small gap between the prongs of the retention part and the body of the battery. The retention part, with the battery, may be inserted into the housing of the sensor device. The tab of the retention part may be inserted into a slot in the housing of the sensor device. The retention part may assist in holding the battery in place within the housing when the sensor device is jostled.

The battery compartment may also include battery connectors that may allow for the connection between the battery and the components of the sensor device to be contained in a smaller space. The positive terminal of the battery may be in contact with a hat, which may be made of a conductive material and may serve as an electrical contact for the positive terminal of the battery. The hat may be connected to a positive spring which may connect to the main circuit board of the sensor device through a cutout in a back piece of the sled. The negative terminal of the battery may be in contact with a coil spring which may be made of a conductive material. A strip of conductive material may be connected to the coil spring, and may traverse the length of the battery and connect to a negative spring. The negative spring may be connected to the main circuit board through a cutout in side of the magazine. A screw may be used to hold the negative spring on the main circuit board at an electrical contact of the main circuit board.

The housing of the sensor device may include a tamper switch which may operate in conjunction with the backplate. The tamper switch may include a detect switch on the lower main circuit board, a frame, and a cap. The cap may be made of a suitable flexible material, such as silicone. The cap may cover the detect switch on the lower main circuit board such that pushing down on the cap may activate the detect switch. For example, the underside of the cap may include a plunger, which may be material that extends down on the underside of the cap. The plunger may hover above, be just in contact with, or push down on but not close the detect switch when the cap is not pushed down, and may push down on the detect switch when the cap is pushed down. The detect switch may default to an open position, in which it is not pushed down far enough to be closed, when no force is holding the detect switch down, or the detect switch is not pushed down far enough. The frame may be made of any suitable material, which may be more rigid than the material of the cap, and may hold the cap in place on the lower main circuit board while covering otherwise exposed portions of the lower main circuit board.

The tamper switch may be located in any suitable location on the sensor device. For example, the lower main circuit board may be located at the top of the magazine, between the snaps. The cap, when not pushed down, may rise above the magazine between the snaps. When the sensor device has not been attached to a backplate, the cap of the tamper switch may be visible on back of the sensor device. The detect switch may be in an open position. When the sensor device is attached to a backplate, for example, using the snaps, the cap may be pushed down by the backplate and may in turn push down the detect switch, resulting in the detect switch being in a closed position. The tamper switch may allow for the determination of whether the sensor device is attached to a backplate. For example, the detect switch of the tamper switch of a sensor device that is attached to a backplate will be in the closed position. If the sensor device is removed from the backplate, for example, falling off or being purposely removed, the detect switch may open, as the plunger of the cap may no longer pushing down the detect switch far enough to close it, allowing the detect switch to return to the open position.

The backplate may include an adhesive strip with a pull tab that may not be visible when the housing of the sensor device is attached to the backplate. The backplate may include an adhesive strip on its back. The adhesive strip may be used to attach the backplate to surfaces, such as a wall. The adhesive strip may be made using an adhesive stretch and release material. A pull tab used to release the adhesive strip may be fed through a slot in the backplate, so that that the pull tab is visible on the other side of the backplate from the adhesive strip. The pull tab may thus be visible when the backplate is attached to a wall but no sensor device is attached to the backplate. Attaching a sensor device to the backplate may cover the pull tab so that it is not visible or accessible to pull. The sensor device may need to be removed from the backplate before the pull tab can be accessed to be pulled, releasing the adhesive strip on the backplate from the wall and allowing the backplate to be removed from the wall.

The backplate may include a bubble level. The backplate may include a slot through which the bubble level may be inserted. The bubble level may be held in place with crush ribs. Crush ribs may be thin ribs which may be designed to deform when the bubble level is pressed into them, allowing for a press fit of the bubble level into the crush ribs. The bubble level may be visible when the sensor device is not attached to the backplate, and may be covered when the sensor device is attached to the backplate. A liner may be placed over the bubble level on the back of the backplate. The liner may adhere to the backplate in between the bubble level and the adhesive strip.

The ALS may be positioned within the housing of the sensor device at a location where the wall of the housing has been thinned. The housing may be made of a material that may be permissive to light transmission of light in the visible spectrum, such as, for example, polycarbonate. A portion of the wall of the housing of the sensor device may be thinned, for example, using a CNC machine tool. The thinned portion of the housing may be at any suitable location on the housing that will not be pointed towards a wall when the sensor device is mounted to a backplate. For example, the thinned portion may be located near the lens for the PIR. The thinned portion of the housing may be formed by, for example, a hole in the housing that starts on the interior of the housing and stops before going through exterior of the housing. The thinned portion of the housing may be thin enough to allow light to pass through the material of the housing. The ALS may be placed below the thinned portion of the housing so that it may receive ambient light that passes through the thinned portion of the housing. A hole used to create a thinned portion of the housing may have a diameter of, for example, 2 mm, and the thinned portion of the housing may be 0.3 mm thick. The distance from the bottom of the thinned portion of the housing to the ALS may be, for example, 1.45 mm.

A corner backplate may allow the sensor device to be installed in the corner of a room. The corner backplate may be a backplate that, when attached to a wall near a corner, allows an attached sensor device to face out from the corner. The corner backplate may also be used to cause the sensor device to face out at an angle when attached to a wall away from a corner. The corner backplate may include slots to accommodate the snaps of the magazine. The corner backplate may be prism shaped. The slots for the snaps may be located on adjacent planes of the prism. An adhesive strip may be located on one the adjacent planes with the slots, to attach the corner backplate to a wall. The other adjacent plane with the slots may include a separate cover piece which may be used to cover the slots once the sensor device is inserted, so that the snaps of the magazine are not exposed. The remaining plane of the prism may be open to accommodate the insertion of the sensor device.

A sleeve may be used to cover the sensor device. The sleeve may be, for example, a plastic cover with an angled opened which may accommodate the housing of the sensor device and a backplate or corner backplate. When the sleeve is placed over the sensor device the lens of the PIR sensor may be visible at the angled opening of the sleeve. The sleeve may include a screw hole, located in any suitable position, which may be used to allow a screw to attach the sleeve to a wall. A spacer may be used behind the screw hole when the sleeve is used with a corner backplate. When the sleeve is used to cover a sensor device, the sleeve may not be removable, and only the lens of the sensor device may be visible, until the screw has been removed from the wall.

Specific examples of devices according to the present disclosure will now be described in further detail with reference to the various drawings. It will be understood that, unless explicitly described to the contrary, the various features illustrated and described may be used in any combination other than the specific combinations shown and described to the extent possible based on the specific physical dimensions and arrangements of the individual features and components.

FIG. 1A shows an example arrangement suitable for a sensor device according to an implementation of the disclosed subject matter. A button assembly 100 for a sensor device may include a lens 110, a metal mask 130, a PIR sensor 140, a filter circuit board 150, a light pipe 160, and an airflow gasket 170. The button assembly may be contained within an opening of a housing 120 of the sensor device. The lens 110 for the PIR sensor 140 may serve as a contact point for a person to push in order to use the button or tactile switch of the sensor device. The lens 110 may be in contact with the light pipe 160. The light pipe 160 may be a ring and may include an outer portion 163 and an inner portion 165. The light pipe 160 may be in turn be in contact with the airflow gasket 170, which may have cutouts to accommodate the light pipe 160. The light pipe 160 may include metal hinges. The PIR sensor 140 may be located underneath the lens 110. The airflow gasket 170 may include a cutout at its center to allow for a line-of-sight from the PIR sensor 140 to the lens 110. The airflow gasket 170 may be positioned to fill space within the housing 120 around the PIR sensor 140 that is not filled by the light pipe 160, the lens 110, or the metal mask 130. The airflow gasket 170 may prevent hot air from entering the sensor device to avoid false positive readings from the PIR sensor 140.

The PIR sensor 140 may be attached directly to the filter circuit board 150 which may perform filtering functions for the PIR sensor 140. The filter circuit board 150 may be any suitable printed circuit board of any suitable size and shape. The filter circuit board 150 may be, for example, 0.5 mm thick. The filter circuit board 150 may rest on a sled 190, and be accommodated in a cutout in a control circuit board 180 that may include the activation mechanism of the button or tactile switch. When a user pushes down on the lens 110, this may push the light pipe downwards 160, and a part of the light pipe 160 may push down on the activation mechanism of the button or tactile switch. This may allow the lens 110 and the PIR sensor 140 to be part of the button or tactile switch of the sensor device.

FIG. 1B shows an example arrangement suitable for a sensor device according to an implementation of the disclosed subject matter. A button or tactile switch 185 may be located on the control circuit board 180, underneath the light pipe 160. Pushing down on the light pipe 160, for example, through pressure on lens 110, may push down on the button or tactile switch 185, allowing it to be activated. This may allow a user to interact with a user interface of the sensor device through pushing down on the lens 110 of the PIR sensor 140.

FIG. 1C shows an example arrangement suitable for a sensor device according to an implementation of the disclosed subject matter. The metal mask 130 may partially cover the inside of the lens of the PIR 110. The metal mask 130 may be located underneath the lens 110, and may cover, for example, half of the lens 110. The metal mask 130 may have any suitable shape. The metal mask 130 may be located within the light pipe 160 along with the part of the lens 110 that surrounds the metal mask 130. The metal mask 130 may, for example, provide rigidity to the lens 110, which may be made of a soft material. The metal mask 130 may cause the PIR sensor 140 to not detect the movement of certain heat sources, for example, heat sources that may be low to the ground in a room, such as animals.

The light pipe 160 may include hinge piece 165. The hinge piece 165 may be, for example, the end knuckles for a hinge formed by the light pipe 160 and the sled 190. The sled 190 may include middle knuckles 192. A pin 191 may join the hinge piece 165 and the middle knuckles 192, and may hold the light pipe 160 to the sled 190 while allowing the light pipe 160 a range of motion. When the lens 110 is pushed, the light pipe 160 may be pushed down while rotating around the pin 191. This may allow the portion of the light pipe 160 opposite the hinge piece 165 to be pushed down onto the activation mechanism of the button or tactile switch 185.

Leads of the PIR sensor 140 may be connected to the filter circuit board 150, and may pass through the filter circuit board 150 to be connected directly to a lower main circuit board 193 of the sensor device. The lens 110, the light pipe 160, the PIR sensor 140, the filter circuit board 150, and the control circuit board 180 may be arranged at an angle to the lower main circuit board 193. The sled 190 may hold the control circuit board 180 at angle, and may include holes which may allow the leads of the PIR sensor 140 to pass through and connect to the lower main circuit board 193. An upper main circuit board 195 may be attached to the sled 190, for example, above the lower main circuit board 193. A shielding 197 may be placed over the upper main circuit board 195. A temperature and humidity sensor 199 may be attached to the sled on an end of the portion of the sled 190 that holds the filter circuit board 150 and the control circuit board 180 at an angle.

FIG. 2A shows an example arrangement suitable for a sensor device according to an implementation of the disclosed subject matter. The sensor device may also include one or more light emitting devices, such as light emitting diodes (LEDs), which may be arranged on and within the sensor device so that their emitted light is visible outside of the housing 120 of the sensor device. An LED 200 may act as a path light. The path light LED 200 may be mounted in the sensor device in between the housing 120 of the sensor device and the portion light pipe 160 inserted into the housing 120. A lens for the path light 200 may be attached to a lens holder 210 formed on the light pipe 160, allowing light from the path light LED 200 to exit the housing 120 of the sensor device. An opening 250 may be located near the path light LED 200. The opening 250 may allow the outside atmosphere to reach the temperature and humidity sensor 199.

FIG. 2B shows an example arrangement suitable for a sensor device according to an implementation of the disclosed subject matter. The light pipe 160 may include the lens holder 210, which may hold a lens for the path light LED 200.

FIG. 2C shows an example arrangement suitable for a sensor device according to an implementation of the disclosed subject matter. The lens holder 210 may be formed such that light from the path light LED 200 is angled downwards toward the floor when the sensor device is mounted to a wall of a room. The lens holder 210 may be located, for example, below the lens 110 of the PIR sensor 140. The visible portions of the light pipe 160 around the lens 110 may serve as a light pipe or light guide for other LEDs of the sensor device.

FIG. 3A shows an example arrangement suitable for a sensor device according to an implementation of the disclosed subject matter. The sensor device may include snaps 310 which may be used to attach the housing 120 of the sensor device to a backplate 350. A magazine 300 within the housing 120 of the sensor device may hold the various components of the sensor device, such as, for example, the sled 190 with attached circuit boards including the upper main circuit board 195 and lower main circuit board 193, control circuit board 180, and filter circuit board 150. The backplate 350 may include slots 355, which may be any suitable size and shape to accommodate the snaps 310 such that the snaps 310 are held in place when inserted into the slots 355. The snaps 310 may include raised portions 315.

FIG. 3B shows an example arrangement suitable for a sensor device according to an implementation of the disclosed subject matter. The magazine 300 may be any suitable shape, such as, for example, a tube with one angled end. The snaps 310 may be an integral component of the magazine 300. The snaps 310 may be, for example, short protrusions or fins of any suitable shape formed on the magazine 300. The magazine 300 may include any suitable number of the snaps 310, such as, for example, two of the snaps 310. The snaps 310 may be arranged on the magazine 300 in any suitable manner and location.

FIG. 3C shows an example arrangement suitable for a sensor device according to an implementation of the disclosed subject matter. The snaps 310 of the magazine 300 may be used to attach the sensor device to the backplate 350. Before or after the backplate 350 is attached to a wall, the sensor device may be attached to the backplate 350 by aligning the snaps 310 of the magazine with the slots 355 of the backplate 350 and pushing the sensor device onto the backplate 350. The snaps 310, once inserted into the slots 355 of the backplate 350, may hold the sensor device to the backplate 350, for example, through friction fitting between the snaps 310 and the slots 355. The snaps 310 of the magazine 300 may not protrude through the slots 355 of the backplate 350, and may be inserted into the slots 355 to any suitable depth based on the depth of the slots 355 and the size of the snaps 310. The backplate 350 may close the housing 120 of the sensor device, covering the magazine 300 and a battery of the sensor device. The snaps 310 may also be used to attach the sensor device to a corner backplate.

FIG. 4A shows an example arrangement suitable for a sensor device according to an implementation of the disclosed subject matter. The housing 120 of the sensor device may include a battery compartment 450 for a battery 460. The battery compartment may include may include a battery retention mechanism. The battery retention mechanism may include a retention part 400, which may, for example, include a U-shaped structure 407 made of any suitable material, such as plastic. The U-shaped structure 407 may include prongs 403 at each end of the U-shaped structure 407 which may protrude away from the U-shaped structure 407, and a tab 405 at the bottom of the curve of the U-shaped structure 407 which may protrude away from the U-shaped structure 407 in the opposite direction from the prongs 403. The retention part 400 may have a different shaped structure, for example, if the battery 460 is rectangular rather than cylindrical.

FIG. 4B shows an example arrangement suitable for a sensor device according to an implementation of the disclosed subject matter. The battery 460 may be inserted into the retention part 400 towards the positive terminal of the battery 460 with the prongs 403 of the retention part separated from the body of the battery 460 by a small gap. The retention part 400 may be inserted into the housing 120 of the sensor device, into the battery compartment 450, along with the battery 460. The tab 405 of the retention part 400 may be inserted into a slot in the housing 120 of the sensor device. The retention part 400 may hold the battery 460 in place within the housing 120 when the sensor device is jostled.

FIG. 5 shows an example arrangement suitable for a sensor device according to an implementation of the disclosed subject matter. The battery compartment 450 may also include battery connectors that may allow for the connection between the battery 460 and the rest of the sensor device in a small space. The positive terminal of the battery 460 may be in contact with a hat 470, which may be made of a conductive material, and may serve as an electrical contact for the positive terminal of the battery 460. The hat 470 may be connected to a positive spring 510, which may connect to the upper main circuit board 195 of the sensor device through a cutout in a back piece of the sled 190. The negative terminal of the battery 460 may be in contact with a coil spring 520, which may be made of a conductive material. A strip 530 of conductive material may be connected to the coil spring 520, and may traverse the length of the battery 460 and connect to a negative spring 540. The negative spring 540 may be connected to upper main circuit board 195 through a cutout in side of the magazine 300. Screw 550 may be used to secure the negative spring 540 to a negative contact 560 on the upper main circuit board 195.

FIG. 6A shows an example arrangement suitable for a sensor device according to an implementation of the disclosed subject matter. The housing 120 of the sensor device may include a tamper switch 600 which may operate in conjunction with the backplate 350. The tamper switch 600 may include a detect switch 635 on a lower main circuit board 193, a frame 610, and a cap 620. The cap 620 may be made of a suitable flexible material, such as silicone, and may cover the detect switch 635 on the lower main circuit board 193 such that pushing down on the cap 620 may activate the detect switch 630. The frame 610 may be made of any suitable material, which may be more rigid than the material of the cap 620, and may hold the cap 620 in place on the lower main circuit board 193 while covering otherwise exposed portions of the lower main circuit board 193.

FIGS. 6B and 6C show example arrangements suitable for a sensor device according to an implementation of the disclosed subject matter. The tamper switch 600 may be located in any suitable location on the back of the housing 120 of the sensor device. For example, the lower main circuit board 193 may be located at the top of the magazine 300, between the snaps 310. The frame 610 and the cap 620 may cover the lower main circuit board 193 in between the snaps 310.

FIG. 6D shows an example arrangement suitable for a sensor device according to an implementation of the disclosed subject matter. The underside of the cap 620 may include a plunger 625, which may be material that extends down on the underside of the cap 620. The plunger 625 may be above, be just in contact with, or push down on but not close, the detect switch 635 when the cap 620 is not pushed down, and may push down on the detect switch 635 when the cap 620 is pushed down. The detect switch 635 may default to an open position, in which it is not pushed down far enough to be closed, when no force is holding the detect switch 635 down, or the detect switch 635 is not pushed down far enough. For example, the backplate 350 may be attached to a wall 680 but the sensor device may not be attached to the backplate 350. This may allow the detect switch 635 to remain in an open position, as no force may be pushing the cap 620 down towards the detect switch 635. When the sensor device has not been attached to the backplate 350, the cap 620 of the tamper switch 600 may be visible on back of the sensor device.

FIG. 6E shows an example arrangement suitable for a sensor device according to an implementation of the disclosed subject matter. When the sensor device is attached to the backplate 350, for example, using the snaps 310, the cap 620 may be pushed down by the backplate 350 and may in turn push down the detect switch 635 through the plunger 625, resulting in the detect switch 635 being in a closed position. The tamper switch 600 may allow for the determination of whether the sensor device is attached to the backplate 350. For example, the detect switch 635 of the tamper switch 600 of a sensor device that is attached to the backplate 350 will be in the closed positioned. If the sensor device is removed from the backplate 350, for example, falling off or being purposely removed, the detect switch 635 may open, as the plunger 625 of the cap 620 may no longer be pushing down on the detect switch 635 allowing the detect switch 635 to return to the open position.

FIG. 7A shows an example arrangement suitable for a sensor device according to an implementation of the disclosed subject matter. The backplate 350 may include an adhesive strip 700 with a pull tab 720 that may not be visible when the housing 120 of the sensor device is attached to the backplate 350. The adhesive strip 700 may be made using an adhesive stretch and release material, which may make up the adhesive strip body 710 and may be released from adhesion using the pull tab 720. The adhesive strip 700 may be used to attach the backplate 350 to surfaces, such as a wall.

FIG. 7B shows an example arrangement suitable for a sensor device according to an implementation of the disclosed subject matter. The backplate 350 may include a slot 730, which may be located in any suitable location on the backplate 350. The slot 730 may allow the adhesives strip body 710 to be adhered to the back of the backplate 350 while the pull tab 720 may be reachable on the front of the backplate 350.

FIGS. 7C and 7D show example arrangements suitable for a sensor device according to an implementation of the disclosed subject matter. The pull tab 720 may be fed through the slot 730 in the backplate 350 so that that the pull tab 720 may be visible on other side of the backplate 350 from the adhesive strip body 710. The pull tab 720 may thus be visible when the backplate 350 is attached to a wall but no sensor device is attached to the backplate 350. Attaching a sensor device to the backplate 350, for example, using the slots 355, may cover the pull tab 720 so that it is not visible or accessible to pull. The sensor device may need to be removed from the backplate 350 before the pull tab 720 can be accessed to be pulled, releasing the adhesive strip 700 on the backplate from the wall and allowing the backplate 350 to be removed from the wall.

FIGS. 8A and 8B show example arrangements suitable for a sensor device according to an implementation of the disclosed subject matter. The backplate 350 may include a bubble level 810. The backplate 350 may include a slot 840 through which the bubble level 810 may be inserted. The bubble level 810 may be held in place with crush ribs 820. The bubble level 810 may be visible when the sensor device is not attached to the backplate 350, and may be covered when the sensor device is attached to the backplate 350. A liner 840 may be placed over the bubble level 810 on the back of the backplate 350. The liner 850 may be in between the bubble level 810 and the adhesive strip 700, for example, to prevent the adhesive strip 700 from adhering to the bubble level 810. The liner 850 may be adhesive so that it may adhere to the backplate 350.

FIGS. 9A and 9B show example arrangements suitable for a sensor device according to an implementation of the disclosed subject matter. An ALS 910 may be positioned within the housing 120 of the sensor device at a location where the wall of the housing 120 has been thinned. A portion of the wall of the housing 120 of the sensor device may be thinned, for example, using a CNC machine tool. A thinned portion 900 of the housing 120 may be at any suitable location on the housing that will not be pointed towards a wall when the sensor device is mounted to a backplate such as the backplate 350. For example, the thinned portion 900 may be located near the lens 110 for the PIR sensor 140. The thinned portion 900 of the housing 120 may be formed by, for example, a hole in the housing 120 that starts on the interior of the housing 120 and stops before going through exterior of the housing 120. The thinned portion 900 of the housing 120 may be thin enough to allow light to pass through the material of the housing 120. The ALS 910 may be placed below the thinned portion 900 so that the ALS 910 may receive ambient light that passes through the thinned portion 900 of the housing 120. A light blocking gasket 920 may be positioned to prevent light from LEDs on the interior of the sensor device from reaching the ALS 910. The thinned portion 900 of the housing 120 may be formed by a hole which may have a diameter of, for example, 2 mm, and the thinned portion 900 of the housing may be 0.3 mm thick. The distance from the bottom of the thinned portion 900 of the housing to the ALS 910 may be, for example, 1.45 mm.

FIGS. 10A-C show example arrangements suitable for a sensor device according to an implementation of the disclosed subject matter. A corner backplate 1000 may allow the sensor device to be installed in the corner of a room. The corner backplate 1000, when attached to a wall near a corner, may allow an attached sensor device to face out from the corner. The corner backplate 1000 may also be used to cause the sensor device to face out at an angle when attached to a wall away from a corner. The corner backplate 1000 may include the slots 355 to accommodate the snaps 310 of the magazine 300. The corner backplate 1000 may be prism shaped. The slots 355 for the snaps 310 may be located on adjacent planes of the prism. An adhesive strip 1020 may be located on one of the adjacent planes with the slots 355, to attach the corner backplate 1000 to a wall. The other adjacent plane with the slots 355 may include a separate cover piece 1010 which may be used to cover the slots 355 once the sensor device is inserted, so that the snaps 310 of the magazine 300 are not exposed. The remaining plane of the prism may be open to accommodate the insertion of the sensor device.

Figure 10D:
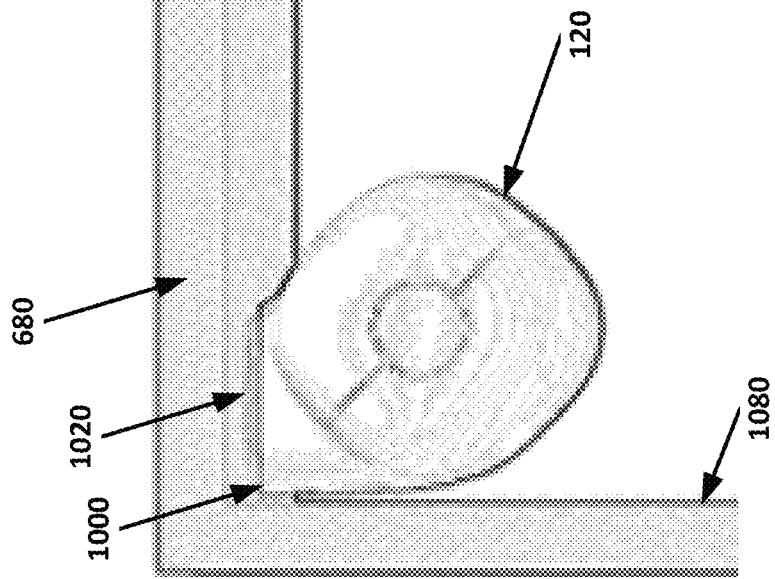
FIG. 10D shows an example arrangement suitable for a sensor device according to an implementation of the disclosed subject matter.
Figure 10C:
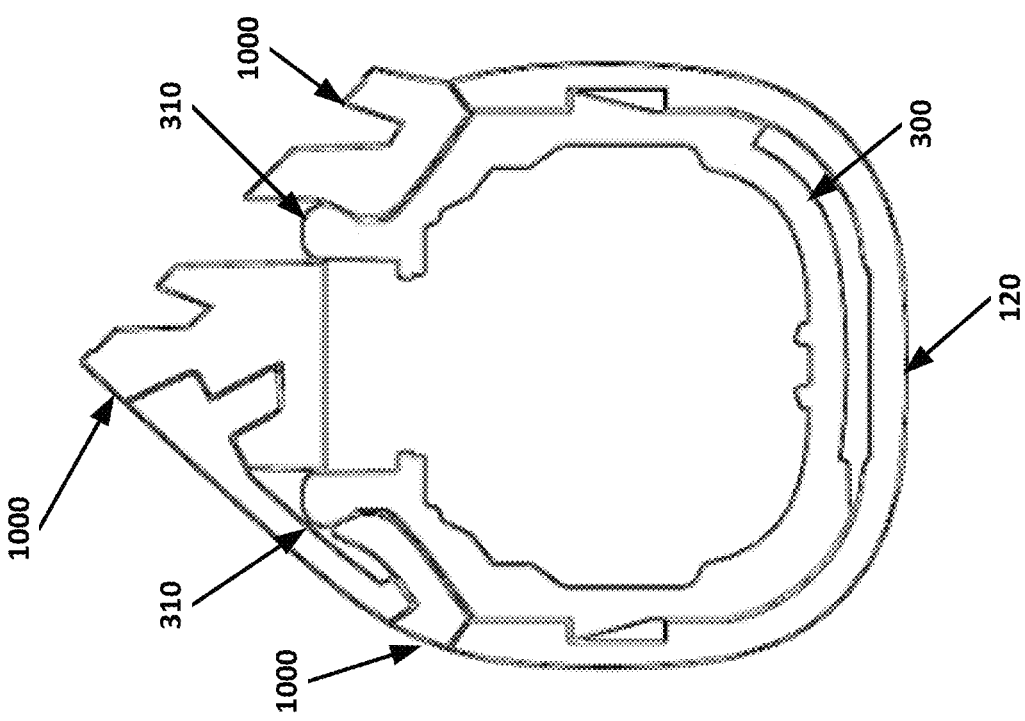
FIG. 10C shows an example arrangement suitable for a sensor device according to an implementation of the disclosed subject matter.

FIG. 10D shows an example arrangement suitable for a sensor device according to an implementation of the disclosed subject matter. The corner backplate 1000 may be used to attach the sensor device to the wall 680 at a corner. The adhesive strip 1020 may be used to attach the corner backplate 1000, with inserted sensor device, to the wall 680 just before the corner. This may result in the plane of the corner backplate 1000 with the adhesive strip 1020 being parallel to the wall 680, while the plane of the corner backplate 1000 with the cover piece 1010 may be parallel to the wall 1080 that forms a corner where it meets the wall 680.

FIG. 11A shows an example arrangement suitable for a sensor device according to an implementation of the disclosed subject matter. A sleeve 1100 may be used to cover the sensor device. The sleeve 1100 may be, for example, a plastic cover with an angled opened which may accommodate the housing 120 of the sensor device and a backplate 350 or corner backplate 1000. The sleeve 1100 may include a screw hole 1105, located in any suitable position, which may be used to allow a screw 1110 to attach the sleeve 1100 to a wall. An adhesive screw cover 1120 may be used to cover the screw hole 1105 after the screw 1110 is inserted. A spacer 1130 may be used when the sleeve 1100 is used to with the corner backplate 1000 to prevent the screw 1110 from being exposed due to the back of the screw hole 1105 not being flush against a wall.

FIG. 11B shows an example arrangement suitable for a sensor device according to an implementation of the disclosed subject matter. When the sleeve 1100 is placed over the sensor device the lens 110 of the PIR sensor 140 may be visible at the angled opening of the sleeve 1100. The sleeve 1100 may also include an opening 1115 at the location of the ALS 910 to allow light to pass through to the ALS 910. The screw 1110 may be used to attach the sleeve 1100 to the wall 680. The sleeve 1110 may cover the housing 120 of the sensor device and the backplate 350, which may not be accessible without removing the sleeve 1100. Removing the sleeve 110 may first require removing the screw 1110 from the wall 680.

Implementations disclosed herein may use one or more sensors. In general, a "sensor" may refer to any device that can obtain information about its environment. Sensors may be described in terms of the type of information they collect. For example, sensor types as disclosed herein may include motion, smoke, carbon monoxide, proximity, temperature, time, physical orientation, acceleration, location, entry, presence, pressure, light, sound, and the like. A sensor also may be described in terms of the particular physical device that obtains the environmental information. For example, an accelerometer may obtain acceleration information, and thus may be used as a general motion sensor and/or an acceleration sensor. A sensor also may be described in terms of the specific hardware components used to implement the sensor. For example, a temperature sensor may include a thermistor, thermocouple, resistance temperature detector, integrated circuit temperature detector, or combinations thereof. A sensor also may be described in terms of a function or functions the sensor performs within an integrated sensor network, such as a smart home environment as disclosed herein. For example, a sensor may operate as a security sensor when it is used to determine security events such as unauthorized entry. A sensor may operate with different functions at different times, such as where a motion sensor is used to control lighting in a smart home environment when an authorized user is present, and is used to alert to unauthorized or unexpected movement when no authorized user is present, or when an alarm system is in an away (e.g., "armed") state, or the like. In some cases, a sensor may operate as multiple sensor types sequentially or concurrently, such as where a temperature sensor is used to detect a change in temperature, as well as the presence of a person or animal. A sensor also may operate in different modes at the same or different times. For example, a sensor may be configured to operate in one mode during the day and another mode at night. As another example, a sensor may operate in different modes based upon a state of a home security system or a smart home environment, or as otherwise directed by such a system.

In general, a "sensor" as disclosed herein may include multiple sensors or sub-sensors, such as where a position sensor includes both a global positioning sensor (GPS) as well as a wireless network sensor, which provides data that can be correlated with known wireless networks to obtain location information. Multiple sensors may be arranged in a single physical housing, such as where a single device includes movement, temperature, magnetic, and/or other sensors. Such a housing also may be referred to as a sensor, a sensor device, or a sensor package. For clarity, sensors are described with respect to the particular functions they perform and/or the particular physical hardware used, when such specification is necessary for understanding of the embodiments disclosed herein.

Figure 12:
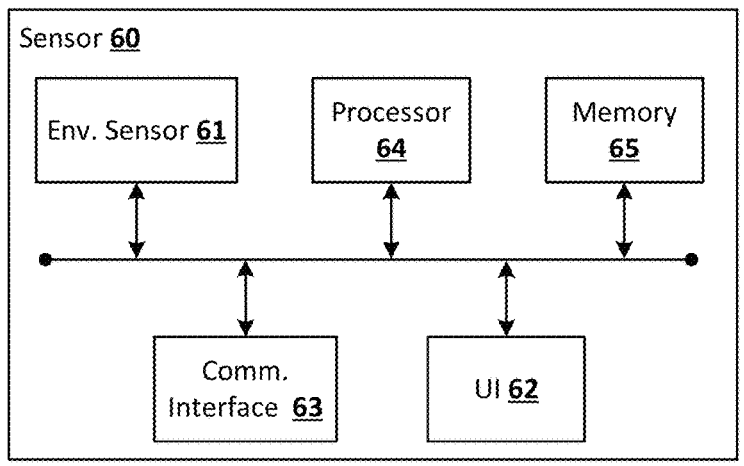
FIG. 12 shows an example sensor as disclosed herein.

A sensor may include hardware in addition to the specific physical sensor that obtains information about the environment. FIG. 12 shows an example sensor as disclosed herein. The sensor 60 may include an environmental sensor 61, such as a temperature sensor, smoke sensor, carbon monoxide sensor, motion sensor, accelerometer, proximity sensor, passive infrared (PIR) sensor, magnetic field sensor, radio frequency (RF) sensor, light sensor, humidity sensor, pressure sensor, microphone, or any other suitable environmental sensor, that obtains a corresponding type of information about the environment in which the sensor 60 is located. A processor 64 may receive and analyze data obtained by the sensor 61, control operation of other components of the sensor 60, and process communication between the sensor and other devices. The processor 64 may execute instructions stored on a computer-readable memory 65. The memory 65 or another memory in the sensor 60 may also store environmental data obtained by the sensor 61. A communication interface 63, such as a Wi-Fi or other wireless interface, Ethernet or other local network interface, or the like may allow for communication by the sensor 60 with other devices. A user interface (UI) 62 may provide information and/or receive input from a user of the sensor. The UI 62 may include, for example, a speaker to output an audible alarm when an event is detected by the sensor 60. Alternatively, or in addition, the UI 62 may include a light to be activated when an event is detected by the sensor 60. The user interface may be relatively minimal, such as a liquid crystal display (LCD), light-emitting diode (LED) display, or limited-output display, or it may be a full-featured interface such as a touchscreen. Components within the sensor 60 may transmit and receive information to and from one another via an internal bus or other mechanism as will be readily understood by one of skill in the art. One or more components may be implemented in a single physical arrangement, such as where multiple components are implemented on a single integrated circuit. Sensors as disclosed herein may include other components, and/or may not include all of the illustrative components shown.

In some configurations, two or more sensors may generate data that can be used by a processor of a system to generate a response and/or infer a state of the environment. For example, an ambient light sensor in a room may determine that the room is dark (e.g., less than 60 lux). A microphone in the room may detect a sound above a set threshold, such as 60 dB. The system processor may determine, based on the data generated by both sensors that it should activate one or more lights in the room. In the event the processor only received data from the ambient light sensor, the system may not have any basis to alter the state of the lighting in the room. Similarly, if the processor only received data from the microphone, the system may lack sufficient data to determine whether activating the lights in the room is necessary, for example, during the day the room may already be bright or during the night the lights may already be on. As another example, two or more sensors may communicate with one another. Thus, data generated by multiple sensors simultaneously or nearly simultaneously may be used to determine a state of an environment and, based on the determined state, generate a response.

Data generated by one or more sensors may indicate a behavior pattern of one or more users and/or an environment state over time, and thus may be used to "learn" such characteristics. For example, data generated by an ambient light sensor in a room of a house and the time of day may be stored in a local or remote storage medium with the permission of an end user. A processor in communication with the storage medium may compute a behavior based on the data generated by the light sensor. The light sensor data may indicate that the amount of light detected increases until an approximate time or time period, such as 3:30 PM, and then declines until another approximate time or time period, such as 5:30 PM, at which point there is an abrupt increase in the amount of light detected. In many cases, the amount of light detected after the second time period may be either below a dark level of light (e.g., under or equal to 60 lux) or bright (e.g., equal to or above 400 lux). In this example, the data may indicate that after 5:30 PM, an occupant is turning on/off a light as the occupant of the room in which the sensor is located enters/leaves the room. At other times, the light sensor data may indicate that no lights are turned on/off in the room. The system, therefore, may learn that occupants patterns of turning on and off lights, and may generate a response to the learned behavior. For example, at 5:30 PM, a smart home environment or other sensor network may automatically activate the lights in the room if it detects an occupant in proximity to the home. In some embodiments, such behavior patterns may be verified using other sensors. Continuing the example, user behavior regarding specific lights may be verified and/or further refined based upon states of, or data gathered by, smart switches, outlets, lamps, and the like.

Sensors as disclosed herein may operate within a communication network, such as a conventional wireless network, a mesh network (e.g., Thread), and/or a sensor-specific network through which sensors may communicate with one another and/or with dedicated other devices. In some configurations, one or more sensors may provide information to one or more other sensors, to a central controller, or to any other device capable of communicating on a network with the one or more sensors. A central controller may be general- or special-purpose. For example, one type of central controller is a home automation network, that collects and analyzes data from one or more sensors within the home. Another example of a central controller is a special-purpose controller that is dedicated to a subset of functions, such as a security controller that collects and analyzes sensor data primarily or exclusively as it relates to various security considerations for a location. A central controller may be located locally with respect to the sensors with which it communicates and from which it obtains sensor data, such as in the case where it is positioned within a home that includes a home automation and/or sensor network. Alternatively or in addition, a central controller as disclosed herein may be remote from the sensors, such as where the central controller is implemented as a cloud-based system that communicates with multiple sensors, which may be located at multiple locations and may be local or remote with respect to one another.

Figure 13:
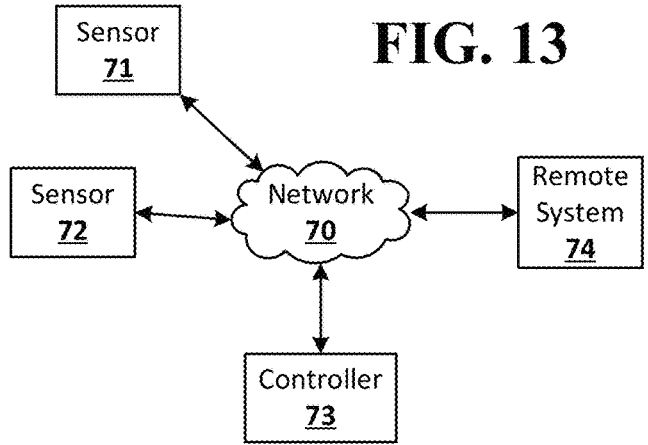
FIG. 13 shows an example of a sensor network as disclosed herein.

FIG. 13 shows an example of a sensor network as disclosed herein, which may be implemented over any suitable wired and/or wireless communication networks. One or more sensors 71, 72 may communicate via a local network 70, such as a Wi-Fi or other suitable network, with each other and/or with a controller 73. The controller may be a general- or special-purpose computer such as a smartphone, a smartwatch, a tablet, a laptop, etc. The controller may, for example, receive, aggregate, and/or analyze environmental information received from the sensors 71, 72. The sensors 71, 72 and the controller 73 may be located locally to one another, such as within a single dwelling, office space, building, room, or the like, or they may be remote from each other, such as where the controller 73 is implemented in a remote system 74 such as a cloud-based reporting and/or analysis system. In some configurations, the system may have multiple controllers 74 such as where multiple occupants' smartphones and/or smartwatches are authorized to control and/or send/receive data to or from the various sensors 71, 72 deployed in the home. Alternatively or in addition, sensors may communicate directly with a remote system 74. The remote system 74 may, for example, aggregate data from multiple locations, provide instruction, software updates, and/or aggregated data to a controller 73 and/or sensors 71, 72.

The sensor network shown in FIG. 13 may be an example of a smart-home environment. The depicted smart-home environment may include a structure, a house, office building, garage, mobile home, or the like. The devices of the smart home environment, such as the sensors 71, 72, the controller 73, and the network 70 may be integrated into a smart-home environment that does not include an entire structure, such as an apartment, condominium, or office space.

The smart home environment can control and/or be coupled to devices outside of the structure. For example, one or more of the sensors 71, 72 may be located outside the structure, for example, at one or more distances from the structure (e.g., sensors 71, 72 may be disposed outside the structure, at points along a land perimeter on which the structure is located, and the like. One or more of the devices in the smart home environment need not physically be within the structure. For example, the controller 73 which may receive input from the sensors 71, 72 may be located outside of the structure.

The structure of the smart-home environment may include a plurality of rooms, separated at least partly from each other via walls. The walls can include interior walls or exterior walls. Each room can further include a floor and a ceiling. Devices of the smart-home environment, such as the sensors 71, 72, may be mounted on, integrated with and/or supported by a wall, floor, or ceiling of the structure.

The smart-home environment including the sensor network shown in FIG. 13 may include a plurality of devices, including intelligent, multi-sensing, network-connected devices, that can integrate seamlessly with each other and/or with a central server or a cloud-computing system (e.g., controller 73 and/or remote system 74) to provide home-security and smart-home features. The controller may determine an intensity level of illumination for lights connected to the smart home system and/or a color or temperature for the lights. The smart-home environment may include one or more intelligent, multi-sensing, network-connected thermostats (e.g., "smart thermostats"), one or more intelligent, network-connected, multi-sensing hazard detection units (e.g., "smart hazard detectors"), and one or more intelligent, multi-sensing, network-connected entryway interface devices (e.g., "smart doorbells"). The smart hazard detectors, smart thermostats, and smart doorbells may be the sensors 71, 72 shown in FIG. 13.

For example, a smart thermostat may detect ambient climate characteristics (e.g., temperature and/or humidity) and may control an HVAC (heating, ventilating, and air conditioning) system accordingly of the structure. For example, the ambient client characteristics may be detected by sensors 71, 72 shown in FIG. 13, and the controller 73 may control the HVAC system (not shown) of the structure.

As another example, a smart hazard detector may detect the presence of a hazardous substance or a substance indicative of a hazardous substance (e.g., smoke, fire, or carbon monoxide). For example, smoke, fire, and/or carbon monoxide may be detected by sensors 71, 72 shown in FIG. 13, and the controller 73 may control an alarm system to provide a visual and/or audible alarm to the user of the smart-home environment.

As another example, a smart doorbell may control doorbell functionality, detect a person's approach to or departure from a location (e.g., an outer door to the structure), and announce a person's approach or departure from the structure via audible and/or visual message that is output by a speaker and/or a display coupled to, for example, the controller 73.

In some embodiments, the smart-home environment of the sensor network shown in FIG. 13 may include one or more intelligent, multi-sensing, network-connected wall switches (e.g., "smart wall switches"), one or more intelligent, multi-sensing, network-connected wall plug interfaces (e.g., "smart wall plugs"). The smart wall switches and/or smart wall plugs may be or include one or more of the sensors 71, 72 shown in FIG. 13. A smart wall switch may detect ambient lighting conditions, and control a power and/or dim state of one or more lights. For example, a sensor such as sensors 71, 72, may detect ambient lighting conditions, and a device such as the controller 73 may control the power to one or more lights (not shown) in the smart-home environment. Smart wall switches may also control a power state or speed of a fan, such as a ceiling fan. For example, sensors 72, 72 may detect the power and/or speed of a fan, and the controller 73 may adjust the power and/or speed of the fan, accordingly. Smart wall plugs may control supply of power to one or more wall plugs (e.g., such that power is not supplied to the plug if nobody is detected to be within the smart-home environment). For example, one of the smart wall plugs may control supply of power to a lamp (not shown).

In embodiments of the disclosed subject matter, a smart-home environment may include one or more intelligent, multi-sensing, network-connected entry detectors (e.g., "smart entry detectors"). Such detectors may be or include one or more of the sensors 71, 72 shown in FIG. 13. The illustrated smart entry detectors (e.g., sensors 71, 72) may be disposed at one or more windows, doors, and other entry points of the smart-home environment for detecting when a window, door, or other entry point is opened, broken, breached, and/or compromised. The smart entry detectors may generate a corresponding signal to be provided to the controller 73 and/or the remote system 74 when a window or door is opened, closed, breached, and/or compromised. In some embodiments of the disclosed subject matter, the alarm system, which may be included with controller 73 and/or coupled to the network 70 may not be placed in an away mode (e.g., "armed") unless all smart entry detectors (e.g., sensors 71, 72) indicate that all doors, windows, entryways, and the like are closed and/or that all smart entry detectors are in an away mode. In some configurations, the system may arm if it can be determined that the distance the door (or window) is ajar is insubstantial (e.g., the opening is not wide enough for a person to fit through).

The smart-home environment of the sensor network shown in FIG. 13 can include one or more intelligent, multi-sensing, network-connected doorknobs (e.g., "smart doorknob"). For example, the sensors 71, 72 may be coupled to a doorknob of a door (e.g., doorknobs 122 located on external doors of the structure of the smart-home environment). However, it should be appreciated that smart doorknobs can be provided on external and/or internal doors of the smart-home environment.

The smart thermostats, the smart hazard detectors, the smart doorbells, the smart wall switches, the smart wall plugs, the smart entry detectors, the smart doorknobs, the keypads, and other devices of a smart-home environment (e.g., as illustrated as sensors 71, 72 of FIG. 13) can be communicatively coupled to each other via the network 70, and to the controller 73 and/or remote system 74 to provide security, safety, and/or comfort for the smart home environment.

A user can interact with one or more of the network-connected smart devices (e.g., via the network 70). For example, a user can communicate with one or more of the network-connected smart devices using a computer (e.g., a desktop computer, laptop computer, tablet, or the like) or other portable electronic device (e.g., a smartphone, a tablet, a key FOB, or the like). A webpage or application can be configured to receive communications from the user and control the one or more of the network-connected smart devices based on the communications and/or to present information about the device's operation to the user. For example, the user can view or change the mode of the security system of the home.

One or more users can control one or more of the network-connected smart devices in the smart-home environment using a network-connected computer or portable electronic device. In some examples, some or all of the users (e.g., individuals who live in the home) can register their mobile device and/or key FOBs with the smart-home environment (e.g., with the controller 73). Such registration can be made at a central server (e.g., the controller 73 and/or the remote system 74) to authenticate the user and/or the electronic device as being associated with the smart-home environment, and to provide permission to the user to use the electronic device to control the network-connected smart devices and the security system of the smart-home environment. A user can use their registered electronic device to remotely control the network-connected smart devices and security system of the smart-home environment, such as when the occupant is at work or on vacation. The user may also use their registered electronic device to control the network-connected smart devices when the user is located inside the smart-home environment.

Alternatively, or in addition to registering electronic devices, the smart-home environment may make inferences about which individuals live in the home and are therefore users and which electronic devices are associated with those individuals. As such, the smart-home environment may "learn" who is a user (e.g., an authorized user) and permit the electronic devices associated with those individuals to control the network-connected smart devices of the smart-home environment (e.g., devices communicatively coupled to the network 70), in some embodiments including sensors used by or within the smart-home environment. Various types of notices and other information may be provided to users via messages sent to one or more user electronic devices. For example, the messages can be sent via email, short message service (SMS), multimedia messaging service (MMS), unstructured supplementary service data (USSD), as well as any other type of messaging services and/or communication protocols.

A smart-home environment may include communication with devices outside of the smart-home environment but within a proximate geographical range of the home. For example, the smart-home environment may include an outdoor lighting system (not shown) that communicates information through the communication network 70 or directly to a central server or cloud-computing system (e.g., controller 73 and/or remote system 74) regarding detected movement and/or presence of people, animals, and any other objects and receives back commands for controlling the lighting accordingly.

The controller 73 and/or remote system 74 can control the outdoor lighting system based on information received from the other network-connected smart devices in the smart-home environment. For example, in the event that any of the network-connected smart devices, such as smart wall plugs located outdoors, detect movement at nighttime, the controller 73 and/or remote system 74 can activate the outdoor lighting system and/or other lights in the smart-home environment.

Figure 14:
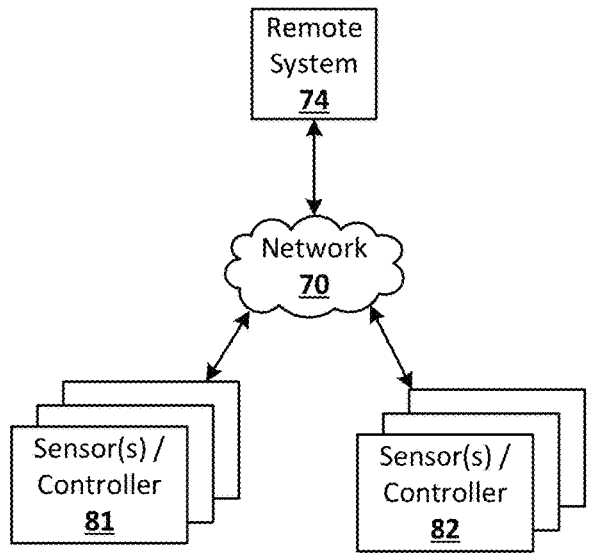
FIG. 14 shows an example configuration of sensors, one or more controllers, and a remote system as disclosed herein.

In some configurations, a remote system 74 may aggregate data from multiple locations, such as multiple buildings, multi-resident buildings, and individual residences within a neighborhood, multiple neighborhoods, and the like. In general, multiple sensor/controller systems 81, 82 as previously described with respect to FIG. 13 may provide information to the remote system 74 as shown in FIG. 14. The systems 81, 82 may provide data directly from one or more sensors as previously described, or the data may be aggregated and/or analyzed by local controllers such as the controller 73, which then communicates with the remote system 74. The remote system may aggregate and analyze the data from multiple locations, and may provide aggregate results to each location. For example, the remote system 74 may examine larger regions for common sensor data or trends in sensor data, and provide information on the identified commonality or environmental data trends to each local system 81, 82.

In situations in which the systems discussed here collect personal information about users, or may make use of personal information, the users may be provided with an opportunity to control whether programs or features collect user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. As another example, systems disclosed herein may allow a user to restrict the information collected by the systems disclosed herein to applications specific to the user, such as by disabling or limiting the extent to which such information is aggregated or used in analysis with other information from other users. Thus, the user may have control over how information is collected about the user and used by a system as disclosed herein.

Figure 15:
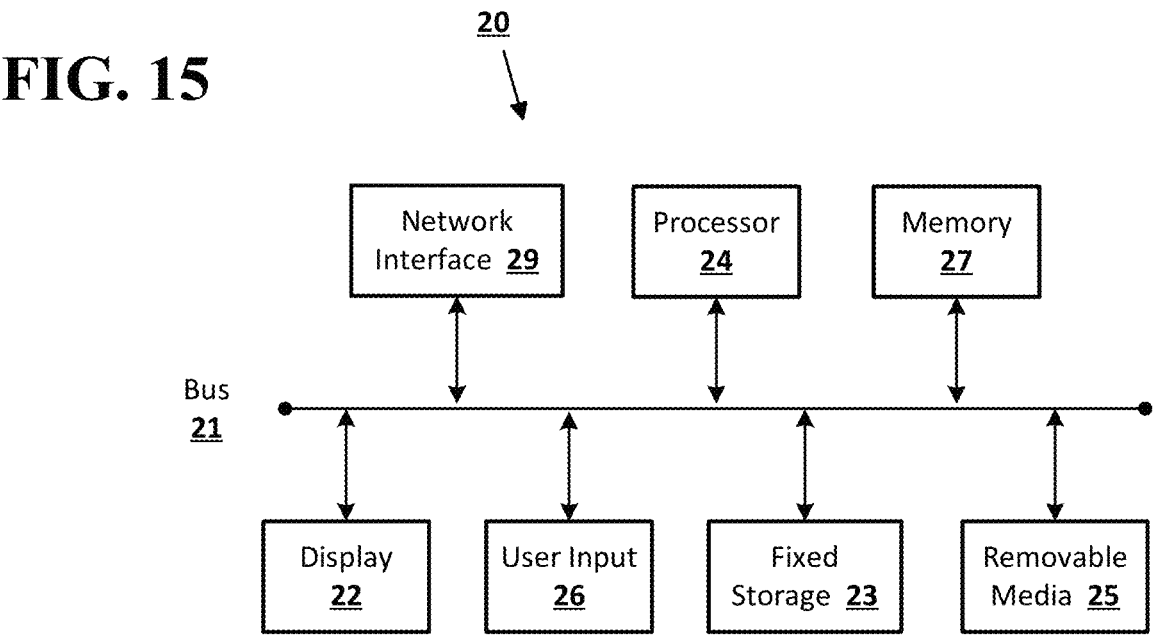
FIG. 15 shows a computer according to an embodiment of the disclosed subject matter.

Implementations of the presently disclosed subject matter may be implemented in and used with a variety of component and network architectures. FIG. 15 is an example computer 20 suitable for implementations of the presently disclosed subject matter. The computer 20 includes a bus 21 which interconnects major components of the computer 20, such as a central processor 24, a memory 27 (typically RAM, but which may also include ROM, flash RAM, or the like), an input/output controller 28, a user display 22, such as a display screen via a display adapter, a user input interface 26, which may include one or more controllers and associated user input devices such as a keyboard, mouse, and the like, and may be closely coupled to the I/O controller 28, fixed storage 23, such as a hard drive, flash storage, Fibre Channel network, SAN device, SCSI device, and the like, and a removable media component 25 operative to control and receive an optical disk, flash drive, and the like.

The bus 21 allows data communication between the central processor 24 and the memory 27, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components. Applications resident with the computer 20 are generally stored on and accessed via a computer readable medium, such as a hard disk drive (e.g., fixed storage 23), an optical drive, floppy disk, or other storage medium 25.

The fixed storage 23 may be integral with the computer 20 or may be separate and accessed through other interfaces. A network interface 29 may provide a direct connection to a remote server via a telephone link, to the Internet via an internet service provider (ISP), or a direct connection to a remote server via a direct network link to the Internet via a POP (point of presence) or other technique. The network interface 29 may provide such connection using wireless techniques, including digital cellular telephone connection, Cellular Digital Packet Data (CDPD) connection, digital satellite data connection, or the like. For example, the network interface 29 may allow the computer to communicate with other computers via one or more local, wide-area, or other networks, as shown in FIG. 16.

Many other devices or components (not shown) may be connected in a similar manner (e.g., document scanners, digital cameras, and so on). Conversely, all of the components shown in FIG. 15 need not be present to practice the present disclosure. The components can be interconnected in different ways from that shown. The operation of a computer such as that shown in FIG. 15 is readily known in the art and is not discussed in detail in this application. Code to implement the present disclosure can be stored in computer-readable storage media such as one or more of the memory 27, fixed storage 23, removable media 25, or on a remote storage location.

Figure 16:
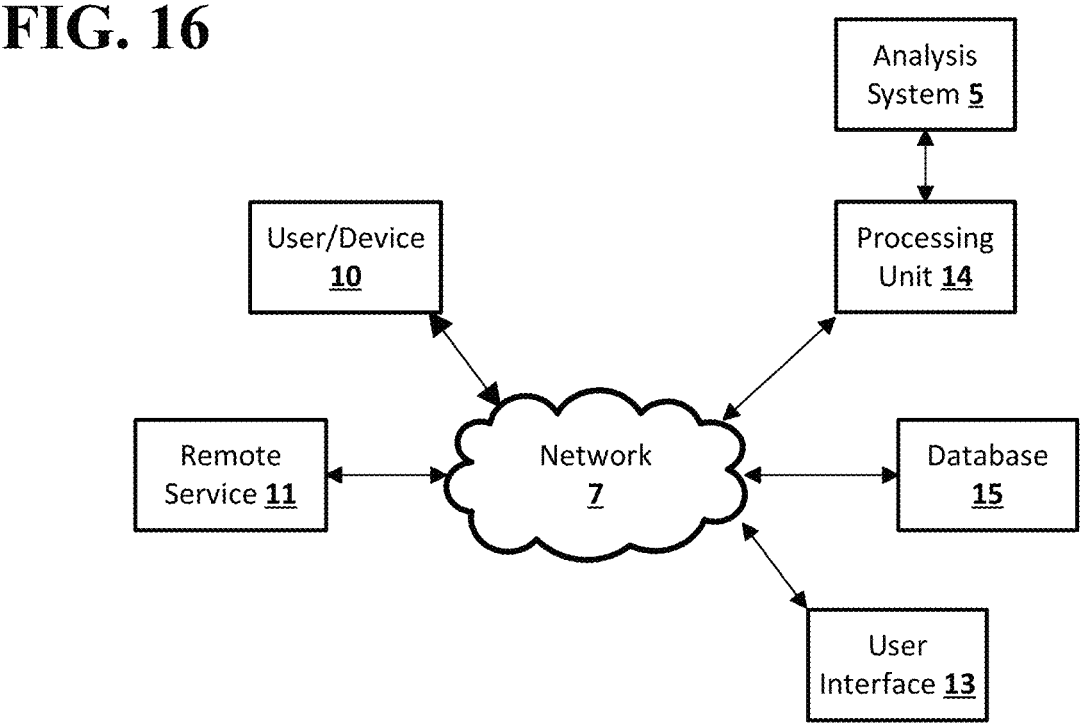
FIG. 16 shows a network configuration according to an embodiment of the disclosed subject matter.

FIG. 16 shows an example network arrangement according to an implementation of the disclosed subject matter. One or more clients 10, 11, such as local computers, smart phones, tablet computing devices, and the like may connect to other devices via one or more networks 7. The network may be a local network, wide-area network, the Internet, or any other suitable communication network or networks, and may be implemented on any suitable platform including wired and/or wireless networks. The clients may communicate with one or more servers 13 and/or databases 15. The devices may be directly accessible by the clients 10, 11, or one or more other devices may provide intermediary access such as where a server 13 provides access to resources stored in a database 15. The clients 10, 11 also may access remote platforms 17 or services provided by remote platforms 17 such as cloud computing arrangements and services. The remote platform 17 may include one or more servers 13 and/or databases 15.

More generally, various implementations of the presently disclosed subject matter may include or be implemented in the form of computer-implemented processes and apparatuses for practicing those processes. The disclosed subject matter also may be implemented in the form of a computer program product having computer program code containing instructions implemented in non-transitory and/or tangible media, such as floppy diskettes, CD-ROMs, hard drives, USB (universal serial bus) drives, or any other machine readable storage medium, wherein, when the computer program code is loaded into and executed by a computer, the computer becomes an apparatus for practicing implementations of the disclosed subject matter. Implementations also may be implemented in the form of computer program code, for example, whether stored in a storage medium, loaded into and/or executed by a computer, or transmitted over some transmission medium, such as over electrical wiring or cabling, through fiber optics, or via electromagnetic radiation, wherein when the computer program code is loaded into and executed by a computer, the computer becomes an apparatus for practicing implementations of the disclosed subject matter. When implemented on a general-purpose microprocessor, the computer program code segments configure the microprocessor to create specific logic circuits. In some configurations, a set of computer-readable instructions stored on a computer-readable storage medium may be implemented by a general-purpose processor, which may transform the general-purpose processor or a device containing the general-purpose processor into a special-purpose device configured to implement or carry out the instructions.

Implementations may use hardware that includes a processor, such as a general-purpose microprocessor and/or an Application Specific Integrated Circuit (ASIC) that embodies all or part of the techniques according to embodiments of the disclosed subject matter in hardware and/or firmware. The processor may be coupled to memory, such as RAM, ROM, flash memory, a hard disk or any other device capable of storing electronic information. The memory may store instructions adapted to be executed by the processor to perform the techniques according to embodiments of the disclosed subject matter.

The foregoing description, for purpose of explanation, has been described with reference to specific implementations. However, the illustrative discussions above are not intended to be exhaustive or to limit implementations of the disclosed subject matter to the precise forms disclosed. Many modifications and variations are possible in view of the above teachings. The implementations were chosen and described in order to explain the principles of implementations of the disclosed subject matter and their practical applications, to thereby enable others skilled in the art to utilize those implementations as well as various implementations with various modifications as may be suited to the particular use contemplated.

The invention claimed is:

1. An apparatus comprising:
   a housing;
   a lens inserted into a first opening of the housing;
   a passive infrared (PIR) sensor underneath the lens; and
   a tamper switch, the tamper switch comprising a cap, a frame placed around the cap, a plunger, and a detect switch, wherein the cap protrudes through an opening in the frame and is positioned to push down the plunger that is positioned to push down the detect switch when pressed against a surface and release the plunger which releases the detect switch when not pressed against a surface.

2. The apparatus of claim 1 further comprising an airflow gasket around the PIR sensor.

3. The apparatus of claim 1, further comprising a filter circuit board under the PIR sensor and connected to one or more leads of the PIR sensor.

4. The apparatus of claim 1 further comprising a control circuit board, wherein an activation mechanism for a button is on the control circuit board.

5. The apparatus of claim 1, further comprising a sled inside the housing.

6. The apparatus of claim 1, further comprising a magazine inside the housing, wherein one or more snaps are formed as part of the magazine.

7. The apparatus of claim 1, wherein the housing comprises a battery compartment and wherein a retention part comprising a U-shaped structure, two prongs at ends of the U-shaped structure, and a tab at a bottom of the U-shaped structure, accommodates insertion of a battery that is inserted into the battery compartment.

8. The apparatus of claim 1, wherein the housing comprises a thinned portion, and wherein an ambient light sensor (ALS) is disposed within the housing below the thinned portion of the housing.

9. The apparatus of claim 1, further comprising a temperature and humidity sensor disposed within the housing beneath a second opening in the housing.

10. The apparatus of claim 1, further comprising a backplate, the backplate comprising at least one slot for attachment to a snap of a magazine disposed in the housing.

11. The apparatus of claim 1, further comprising a backplate, wherein an adhesive strip is attached to a back of the backplate and a pull tab of the adhesive strip is pulled through a slot of the backplate to a front of the backplate.

12. The apparatus of claim 1, further comprising a backplate, the backplate comprising a slot and crush ribs for a bubble level, the bubble level disposed in between crush ribs at a location of the slot.

13. The apparatus of claim 1, further comprising a corner backplate, the corner backplate comprising at least one slot for attachment to a snap of a magazine disposed in the housing, wherein an adhesive strip is attached to a first plane of the corner backplate, wherein a second plane of the corner backplate is perpendicular to the first plane of the corner backplate, and wherein magazine and housing attach to the corner backplate in between the first plane and the second plane.

14. The apparatus of claim 1, further comprising a sleeve, the sleeve covering the housing, the sleeve further comprising a screw hole.

15. The apparatus of claim 1, further comprising:
a metal mask covering a portion of an interior of the lens; and
a light pipe around the PIR sensor, the lens, and the metal mask, at least a portion of the light pipe positioned above an activation mechanism for a button.

16. The apparatus of claim 15, wherein the light pipe further comprises a lens for a path light, and wherein an LED for the path light is disposed within the housing below the light pipe.

17. An apparatus comprising:
a sensor device comprising:
a housing comprising a first opening at an angle at a first end of the housing and a second opening on a body of the housing;
a tamper switch, the tamper switch comprising a cap, a frame placed around the cap, a plunger and a detect switch, wherein the cap protrudes through an opening in the frame and is positioned to push down the plunger that is positioned to push down the detect switch when pressed against a surface and release the plunger which releases the detect switch when not pressed against a surface;
a button assembly comprising a lens, a metal mask covering a portion of an interior of the lens, a passive infrared (PIR) sensor underneath the lens and the metal mask, a light pipe around the PIR sensor, the lens, and the metal mask, at least a portion of the light pipe positioned above an activation mechanism for a button, and an airflow gasket around the PIR sensor, wherein the lens and the light pipe at least partially cover the first opening of the housing;
a magazine disposed in the housing, the magazine comprising at least two snaps protruding from the magazine through the second opening in the housing, and wherein the tamper switch is attached between the snaps of the magazine; and
a sled disposed in the magazine within the housing, wherein an upper main circuit board and a lower main circuit board are attached to the sled above and below a main body of the sled and a filter circuit board and control circuit board are attached to an angled portion of the sled below the PIR sensor.

18. The apparatus of claim 17, further comprising a backplate comprising at least two slots, the slots accommodating the snaps of the magazine of the sensor device to attach the sensor device to the backplate, and wherein the backplate covers the second opening of the housing and presses the tamper switch when the sensor device is attached to the backplate.

19. The apparatus of claim 17, further comprising an ambient light sensor (ALS), wherein the ALS is disposed below a thinned portion of the housing of the sensor device.

20. The apparatus of claim 17, wherein the sled further comprises knuckles, and wherein the light pipe further comprises end knuckles, and wherein knuckles of the sled, the end knuckles of the light pipe, and a pin, form a hinge.

* * * * *